United States Patent
Palfner et al.

(10) Patent No.: US 10,375,401 B2
(45) Date of Patent: *Aug. 6, 2019

(54) MOVING PICTURE CODING METHOD, MOVING PICTURE DECODING METHOD, AND APPARATUSES OF THE SAME

(71) Applicant: Sun Patent Trust, New York, NY (US)

(72) Inventors: Torsten Palfner, Langen (DE); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,110

(22) Filed: Sep. 13, 2018

(65) Prior Publication Data
US 2019/0014328 A1    Jan. 10, 2019

Related U.S. Application Data

(60) Continuation of application No. 14/822,096, filed on Aug. 10, 2015, now Pat. No. 10,104,381, which is a
(Continued)

(30) Foreign Application Priority Data

Nov. 8, 2005 (EP) .................................. 05024329

(51) Int. Cl.
*H04N 19/174* (2014.01)
*H04N 19/182* (2014.01)
(Continued)

(52) U.S. Cl.
CPC ......... *H04N 19/174* (2014.11); *H04N 19/129* (2014.11); *H04N 19/14* (2014.11);
(Continued)

(58) Field of Classification Search
CPC .. H04N 19/174; H04N 19/182; H04N 19/129; H04N 19/176; H04N 19/14; H04N 19/70; H04N 19/11; H04N 19/86
(Continued)

(56) References Cited

U.S. PATENT DOCUMENTS 5,694,489 A * 12/1997 Kishi ...................... G06T 9/007
                                                    375/240.24
5,767,909 A    6/1998 Jung
(Continued)

FOREIGN PATENT DOCUMENTS

EP    0 230 632      8/1987
JP    2004-253826    9/2004
(Continued)

OTHER PUBLICATIONS

International Search Report dated Jan. 23, 2007 in the international (PCT) Application of which the present application is the U.S. National Stage.
(Continued)

*Primary Examiner* — Kwang B Yao
*Assistant Examiner* — Syed M Bokhari
(74) *Attorney, Agent, or Firm* — Wenderoth, Lind & Ponack, L.L.P.

(57) ABSTRACT

A moving picture coding method includes partitioning a picture into blocks each of which includes pixels, selecting a scanning scheme from among plural scanning schemes, scanning the blocks according to the selected scanning scheme, and coding the blocks in an order in which the blocks are scanned. In the partitioning, the picture is partitioned into rows and columns of macroblocks each of which is partitioned into the blocks. The plural scanning schemes include a first scanning scheme for scanning the blocks in the marcroblock per row of blocks.

2 Claims, 20 Drawing Sheets

Related U.S. Application Data division of application No. 13/572,885, filed on Aug. 13, 2012, now Pat. No. 9,137,538, which is a division of application No. 12/092,141, filed as application No. PCT/JP2006/322020 on Nov. 2, 2006, now Pat. No. 8,295,351.

(51) Int. Cl.
| | | |
|---|---|---|
| *H04N 19/176* | (2014.01) | |
| *H04N 19/129* | (2014.01) | |
| *H04N 19/14* | (2014.01) | |
| *H04N 19/70* | (2014.01) | |
| *H04N 19/11* | (2014.01) | |
| *H04N 19/86* | (2014.01) | |

(52) U.S. Cl.
CPC ......... *H04N 19/176* (2014.11); *H04N 19/182* (2014.11); *H04N 19/11* (2014.11); *H04N 19/70* (2014.11); *H04N 19/86* (2014.11)

(58) Field of Classification Search
USPC .................................... 375/240.12, 240.13
See application file for complete search history.

(56) References Cited

U.S. PATENT DOCUMENTS

| | | | |
|---|---|---|---|
| RE39,318 E | * | 10/2006 | Nishi ................... H04N 19/105 375/240.13 |
| 7,379,499 B2 | | 5/2008 | Dahlhoff et al. |
| 2003/0048208 A1 | | 3/2003 | Karczewicz |
| 2005/0089094 A1 | | 4/2005 | Yoo et al. |
| 2005/0089235 A1 | | 4/2005 | Sakaguchi et al. |
| 2007/0019729 A1 | * | 1/2007 | Nakagomi ........... H04N 7/5086 375/240.13 |
| 2007/0071087 A1 | | 3/2007 | Kim et al. |

FOREIGN PATENT DOCUMENTS

| | | |
|---|---|---|
| JP | 2005-130509 | 5/2005 |
| JP | 2005-160048 | 6/2005 |
| JP | 2005-295526 | 10/2005 |

OTHER PUBLICATIONS

ISO/IEC 14496-10, version 1, "Information technology—Coding of audio-Visual objects—Part 10: Advanced Video coding", Dec. 2003.

English translation of paragraphs [0078][0080] and [0082], as well as Figures 1, 2, 13, 14 and 18, of JP 2005-295526, published Oct. 2005.

Extended European Search Report dated Apr. 10, 2014 in corresponding European Application No. 06822938.4.

Jong Hwa Lee et al., "An Efficient Encoding of DCT Blocks with Block-Adaptive Scanning," IEICE Transactions on Communications, Communications Society, Tokyo, JP, vol. E77-B, No. 12, Dec. 1, 1994, pp. 1489-1494, XP000498064, ISSN: 0916-8516.

Summons to attend oral proceedings dated Oct. 4, 2016 issued in corresponding European patent Application No. 06822938.4.

* cited by examiner

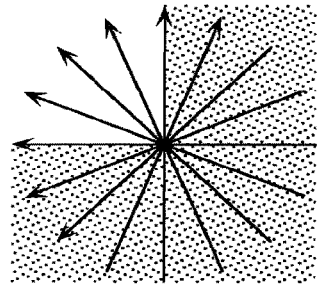
FIG. 10A Downwards (starting upper-left)
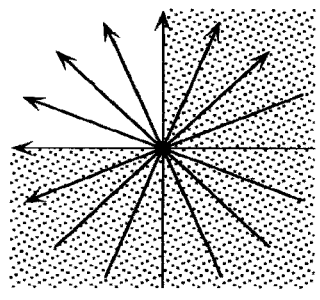
FIG. 10C Right-to-Left (starting upper-right)
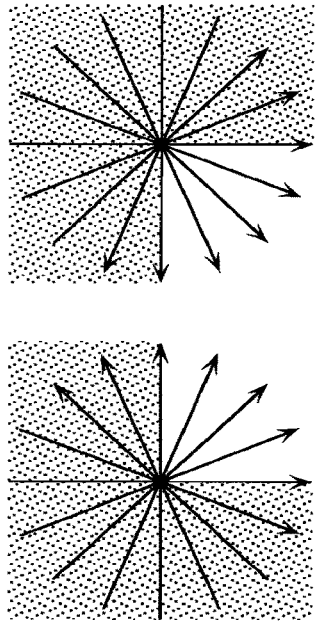
FIG. 10E Upwards (starting lower-left)
FIG. 10G Left-to-Right (starting lower-left)
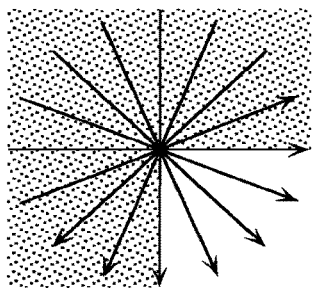
FIG. 10B Downwards (starting upper-right)
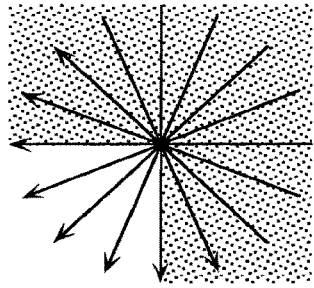
FIG. 10D Right-to-Left (starting lower-right)
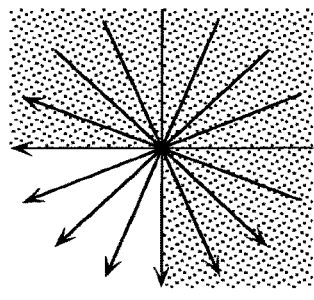
FIG. 10F Upwards (starting lower-right)
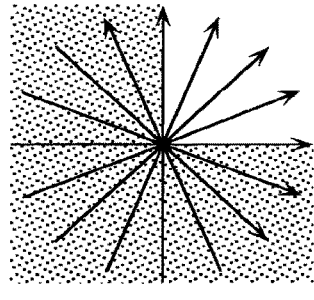
FIG. 10H Left-to-Right (starting upper-left)

MOVING PICTURE CODING METHOD, MOVING PICTURE DECODING METHOD, AND APPARATUSES OF THE SAME

BACKGROUND OF THE INVENTION

Technical Field

The present invention relates to coding for compression of moving picture data, and in particular to a moving picture coding method, a moving picture decoding method, and apparatuses of the same which achieve high coding efficiency.

Background Art

Moving picture data is being adopted in increasing numbers of applications, ranging from video-telephoning and video-conferencing to DVD and digital television. When moving picture data is being transmitted or recorded, a substantial amount of data has to be sent through conventional transmission channels of limited available frequency bandwidth or has to be stored on conventional storage media of limited data capacity. In order to transmit and store digital data on conventional channels and media, it is inevitable to compress or reduce the volume of digital data.

For the compression of moving picture data, a plurality of moving picture coding standards has been developed. Such moving picture standards are, for instance, the ITU-T standard denoted by H.26x and ISO/IEC standards denoted by MPEG-x. The letter "x" represents for example, 1, 2, and 4. The most up-to-date and advanced moving picture coding standard is currently the standard denoted as H.264/MPEG-4 AVC.

The coding approach underlying most of these standards consists of the following main stages:
(a) Partitioning each individual video frame into blocks which include pixels, in order to subject each video frame to data compression at a block level.
(b) Scanning each block of moving picture data according to a fixed scanning scheme that defines the order in which the blocks will be coded.
(c) Predicting each scanned block by exploiting either temporal dependencies between blocks of subsequent frames (motion compensation) or spatial dependencies between the current block and previously coded blocks of the same frame (intra-frame prediction).
(d) Computing a residual between the scanned block and its prediction, and coding the residual of each block.

It is a particular approach of current moving picture coding standards that the image information is transformed from the spatial domain into the frequency domain. Image compression is achieved by representing the image content by only a few frequency components. A natural image content is mostly concentrated in the coefficients of the lower frequency domain. Higher frequency parts, for which the human eye is less sensitive anyway, can thus be removed or quantized in order to lower the amount of data to be coded.

In many applications, the volume or bandwidth available for storing or transmitting coded moving picture data is seriously restricted. There is thus the urgent need to compress the moving picture data as far as possible. However, increasing data compression rate by quantizing even more coarsely in order to reduce the amount of data inevitably leads to a deterioration of image quality.

FIG. 1 is a block diagram illustrating a structure of a moving picture coding apparatus of the prior art. A moving picture coding apparatus 100 includes a subtractor 110, a transform and quantization unit 120, an inverse quantization and inverse transform unit 130, an adder 135, a deblocking filter 137, a memory 140, an intra-frame prediction unit 150, a motion compensation prediction unit 160, a motion estimator unit 170, an intra/inter switch 180, and an entropy coding unit 190. The subtractor 110 calculates a difference between a current block to be coded and a prediction signal which is based on a previously coded block stored in the memory 140. The transform and quantization unit 120 transforms the prediction error obtained from the subtractor 110 from the spatial domain to the frequency domain and quantizes the obtained transform coefficients. The entropy coding unit 190 entropy codes the quantized transform coefficients.

In accordance with the H.264/AVC standard, the input image is partitioned into macroblocks. The moving picture coding apparatus 100 only transmits differences between blocks of an input moving picture sequence and their predictions based on previously coded blocks ("the locally decoded image"). These differences are determined in the subtractor 110, which receives the blocks to be coded in order to subtract the prediction signal therefrom.

The locally decoded image is provided by a local decoding unit (the inverse quantization and inverse transform unit 130, the adder 135, and the deblocking filter 137) incorporated into the moving picture coding apparatus 100. The local decoding unit performs the coding steps in reverse manner. The inverse quantization and inverse transform unit 130 dequantizes the quantized coefficients and applies an inverse transform to the dequantized coefficients. In the adder 135, the differences obtained by the inverse transform are added to the prediction signal to form the locally decoded image. Further, the deblocking filter 137 reduces block noise in the decoded image.

The type of prediction that is employed by the moving picture coding apparatus 100 depends on whether the macroblocks are coded in "Intra" or "Inter" mode. In "Intra" mode, the moving picture coding standard H.264/AVC uses a prediction scheme based on already coded macroblocks of the same image in order to predict subsequent macroblocks. In "Inter" mode, motion compensation/prediction between corresponding blocks of several consecutive frames is employed.

Only Intra-coded images (I-pictures) can be decoded without reference to any previously decoded image. The I-pictures provide error propagation resilience for the coded moving picture sequence. Further, entry points into bit streams of coded data are provided by the I-pictures in order to enable a random access, that is, to access I-pictures within the coded moving picture sequence. A switch between Intra-mode, that is, a processing by the intra-frame prediction unit 150, and Inter-mode, that is, a processing by the motion compensation prediction unit 160, is controlled by the intra/inter switch 180.

In "Inter" mode, a macroblock is predicted from blocks of previous frames by employing motion compensation. The motion prediction is accomplished by the motion estimator unit 170, receiving the current input signal and the locally decoded image. Motion estimation yields two-dimensional motion vectors which represent a pixel motion between the current block and the corresponding block in previous frames. Based on the estimated motion, the motion compensation prediction unit 160 provides a prediction signal.

For both the "Intra" and the "Inter" coding modes, the differences between the current and the predicted signal are transformed into transform coefficients by the transform and quantization unit 120. Generally, an orthogonal transform such as a two-dimensional Discrete Cosine Transform (DCT) or an integer version thereof is employed.

The transform coefficients are quantized in order to reduce the amount of data that has to be coded. The step of quantization is controlled by quantization tables that specify the accuracy and the number of bits that are used to code each frequency coefficient. Lower frequency components are usually more important for image quality than fine details so that more bits are spent for coding the low frequency components than for the higher ones.

For reconstructing the coded images by a decoding apparatus, the coding process is applied in reverse manner.

FIG. 2 is a block diagram illustrating a structure of a moving picture decoding apparatus of the prior art. A moving picture decoding apparatus 200 includes an entropy decoding unit 210, an inverse quantization and inverse transform unit 220, an adder 230, a deblocking filter 240, a memory 250, an intra-frame prediction unit 260, and a motion compensation prediction unit 270.

In the entropy decoding unit 210, entropy coding of transform coefficients and motion data by the entropy coding unit 190 is reversed. The entropy decoded block is then submitted to the inverse quantization and inverse transform unit 220 and the entropy decoded motion data is sent to the motion compensation prediction unit 270. The result of the inverse quantization and inverse transform contains prediction errors. The prediction errors are added by the adder 230 to the prediction signal stemming from the motion compensation prediction unit 270 in Inter-mode or stemming from the intra-frame prediction unit 260 in Intra-mode. The reconstructed image is passed through the deblocking filter 240 and is stored in the memory 250 to be used by the intra-frame prediction unit 260 and the motion compensation prediction unit 270.

According to the H.264/AVC standard, an image is partitioned into non-overlapping macroblocks of 16×16 pixels size. These macroblocks may be further partitioned into 4-by-4 blocks of 4×4 pixels size or into 2-by-2 blocks of 8×8 pixels size. These macroblocks together with the unpartitioned 16×16 pixel size block are then referred to as I4MB (Macro Block), I8MB, and I16MB, respectively.

The above described coding and decoding mechanisms are applied to each block separately. Consequently, the 2-dimensional arrangement of blocks has to be converted into a 1-dimensional sequence in which the blocks will be handled by the coding apparatus and the decoding apparatus. In other words, the blocks have to be scanned according to a certain scanning scheme that defines the order in which the blocks will be processed.

FIG. 3 is a diagram illustrating a scanning scheme for blocks in accordance with the H.264/AVC standard. Arrows indicate the order in which blocks of an I8MB macroblock (310) and an I4MB macroblock (320) are scanned. Numerals 0 to 15 in the figure give the order in which the 4×4 pixel blocks of the I4MB macroblock (320) are scanned. Reference 350 indicates individual pixels of the blocks.

The order in which the blocks are scanned is particularly important for intra-coded blocks, that is, for blocks where spatial correlations are exploited in order to reduce the amount of information that has to be coded. As described above, intra-coded blocks are predicted from adjacent pixels of already coded blocks. This prediction value is subtracted from the actual block and only the residual is coded. Hence, prediction accuracy is crucial for a high compression ratio.

FIG. 4A is a diagram illustrating the intra-prediction of a macroblock as specified in the H.264/AVC standard. In the figure, the shaded area represents already coded blocks, whereas non-shaded area represents blocks yet to be coded. The 4×4 pixels of the current block 6 have to be extrapolated from adjacent pixels of already coded blocks. The 13 pixels (430) made up of one pixel of a block 1, four pixels of a block 3, four pixels of a block 4, four pixels of a block 5 are employed to predict the current block by replicating the corresponding pixel values in a certain prediction direction (440).

FIG. 4B summarizes the nine different prediction modes defined in the H.264/AVC standard. Modes 0, 1, and 3 to 8 are characterized by the prediction direction in which the reference pixels (430) are replicated into the current block. For example, in mode 1, four pixels of the block 4 are replicated as prediction values of the 4×4 pixels of the current block. Mode 2 (DC) employs the average of the reference pixels to fill the current block homogeneously, as a prediction value of each pixel of the current block.

Non-Patent Reference 1: ITU-T Rec.H264|ISO/IEC 14496-10 version 1 "Information technology—Coding of audio-visual objects—Part 10: Advanced video coding"

However, according to the above described techniques of the prior art, there is a problem that it is not possible to improve the spatial prediction accuracy in the intra-prediction. This results in a problem that the coding efficiency cannot be improved either. With reference to FIGS. 5A and 5B, these problems shall be described concretely. In the figure, the shaded area represents previously coded blocks, whereas non-shaded area represents blocks yet to be coded.

As it is apparent from the scanning order and the examples shown in FIGS. 5A and 5B, not all reference pixels are available for all blocks. In FIG. 5A, for example, a block 3 has to be predicted without the four reference pixels (540) of the block 4, because the block 4 has not yet been coded. This impairs intra-prediction modes 3 and 7, and leads to a higher prediction error. Hence, more bits have to be spent to code the residual, and the prediction accuracy and the coding efficiency degrade. Further, the higher prediction error leads to lower image quality.

FIG. 5B shows another example of missing reference pixels due to the scanning order. A block 13 has to be coded without four reference pixels (540) that are part of the next macroblock. Consequently, the prediction accuracy is impaired, leading to higher prediction errors and degraded performance of the coding apparatus.

Another problem of the H.264/AVC standard is related to the set of available prediction modes. This set of prediction modes is asymmetric in the sense that prediction direction is primarily diagonally down right. In other words, there is, for instance, no horizontal left or vertical up prediction mode. Obviously, this asymmetry is due to the primary scanning direction of the H.264/AVC standard, which is also diagonally down right. It is well conceivable that depending on the image content, certain prediction directions other than those shown in FIG. 4B may deliver superior prediction accuracy. However, due to the fixed scanning scheme of H.264/AVC standard, no such improvement can be realized.

An object of the present invention is to provide a moving picture coding method, a moving picture decoding method, and apparatuses of the same that improve the spatial prediction accuracy in intra-prediction.

SUMMARY OF THE INVENTION

In order to achieve the above mentioned object, the moving picture coding method according to the present invention is a moving picture coding method for coding a moving picture which includes pictures, the method comprising: partitioning a picture into blocks each of which includes pixels; selecting a scanning scheme from among plural scanning schemes; scanning the blocks according to the selected scanning scheme; and coding the blocks in an order in which the blocks are scanned.

With this, it is possible to improve the spatial prediction accuracy because selecting a scanning scheme allows more reference pixels to be available for spatial prediction. As a result, the coding efficiency and image quality can be improved.

Here, it may be that in the partitioning, the picture is partitioned into rows and columns of macroblocks each of which is partitioned into the blocks.

With this, it is possible to select a scanning scheme that is suitable for the way the blocks are partitioned.

Here, it may be that the plural scanning schemes include a first scanning scheme for scanning the blocks in the macroblock per row of blocks.

Here, it may be that the plural scanning schemes include a first scanning scheme for scanning the blocks in horizontally adjacent macroblocks per row of blocks beyond a border of the adjacent macroblocks.

Here, it may be that when the first scanning scheme is selected, a scanning direction for scanning the row of blocks is selected from one of left-to-right and right-to-left in the selecting.

Here, it may be that in the coding: a prediction scheme is selected from among plural prediction schemes based on the selected scanning direction; and the blocks are coded using the selected prediction scheme. The plural prediction schemes may include a first prediction scheme and a second prediction scheme for determining a prediction value of the pixels in the block, the first prediction scheme being a scheme in which a set of plural prediction directions is available, and the second prediction scheme being a scheme in which a set of plural prediction directions different from the set of the first prediction scheme is available.

With this, it is possible to select a scanning scheme suitable for the selected scanning scheme, and therefore the prediction accuracy and the coding efficiency can be further improved.

Here, it may be that the moving picture coding method further comprises detecting a direction of an image edge included in a predetermined portion of the picture, and that in the selecting, a scanning scheme is selected based on the detected edge direction.

With this, since it is possible to select a scanning scheme suitable for the image content, the prediction accuracy and the coding efficiency can be further improved.

Here, it may be that the moving picture coding method further comprises inserting, into a coded moving picture, an identifier indicating the selected scanning scheme.

With this, the process of determining a scanning scheme, performed by a decoding apparatus, can be facilitated.

In addition, the moving picture decoding method according to the present invention is a moving picture decoding method for decoding a coded moving picture which includes pictures, the method comprising: detecting, from the coded moving picture, a block partition into which a picture is partitioned, the picture including blocks each of which includes pixels; determining a scanning scheme from among plural scanning schemes each indicating an order of blocks within the picture; obtaining, from the coded moving picture, a coded block which includes pixels; decoding the coded block; and arranging the decoded block in the picture according to the detected block partition and the determined scanning scheme.

With this, it is possible to adapt to the improvement of the spatial prediction accuracy and coding efficiency, because more reference pixels are made available for spatial prediction.

Here, it may be that the picture is partitioned into rows and columns of macroblocks each of which is partitioned into rows and columns of blocks.

Here, it may be that in the determining, the scanning scheme is determined according to a scanning scheme identifier included in the coded moving picture.

Here, it may be that the moving picture decoding method further comprises detecting a direction of an image edge included in a predetermined portion of the picture, and that in the determining, a scanning scheme is determined from among the plural scanning schemes based on the detected edge direction.

Here, it may be that in the determining, a scanning direction for scanning a row of blocks is selected from one of left-to-right and right-to-left.

Here, it may be that the plural scanning schemes include a first scanning scheme for scanning of the blocks in the macroblock per row of blocks.

Here, it may be that the plural scanning schemes include a first scanning scheme for scanning the blocks in horizontally adjacent macroblocks per row of blocks beyond a border of the adjacent macroblocks.

In addition, the moving picture coding apparatus, the moving picture decoding apparatus, and the semiconductor device according to the present invention have structures and produce advantages similar to the structures and the advantages of the above described moving picture coding method or the moving picture decoding method.

According to the moving picture coding method of the present invention, it is possible to adapt to improvement of the spatial prediction accuracy and coding efficiency. As a result, image quality can be improved.

BRIEF DESCRIPTION OF DRAWINGS

FIG. 10A is a diagram illustrating a first set of prediction directions for determining prediction values of pixels in blocks.

FIG. 10B is a diagram illustrating a second set of prediction directions for determining prediction values of pixels in blocks.

FIG. 10C is a diagram illustrating a third set of prediction directions for determining prediction values of pixels in blocks.

FIG. 10D is a diagram illustrating a fourth set of prediction directions for determining prediction values of pixels in blocks.

FIG. 10E is a diagram illustrating a fifth set of prediction directions for determining prediction values of pixels in blocks.

FIG. 10F is a diagram illustrating a sixth set of prediction directions for determining prediction values of pixels in blocks.

FIG. 10G is a diagram illustrating a seventh set of prediction directions for determining prediction values of pixels in blocks.

FIG. 10H is a diagram illustrating an eighth set of prediction directions for determining prediction values of pixels in blocks.

NUMERICAL REFERENCES

Figure 1:
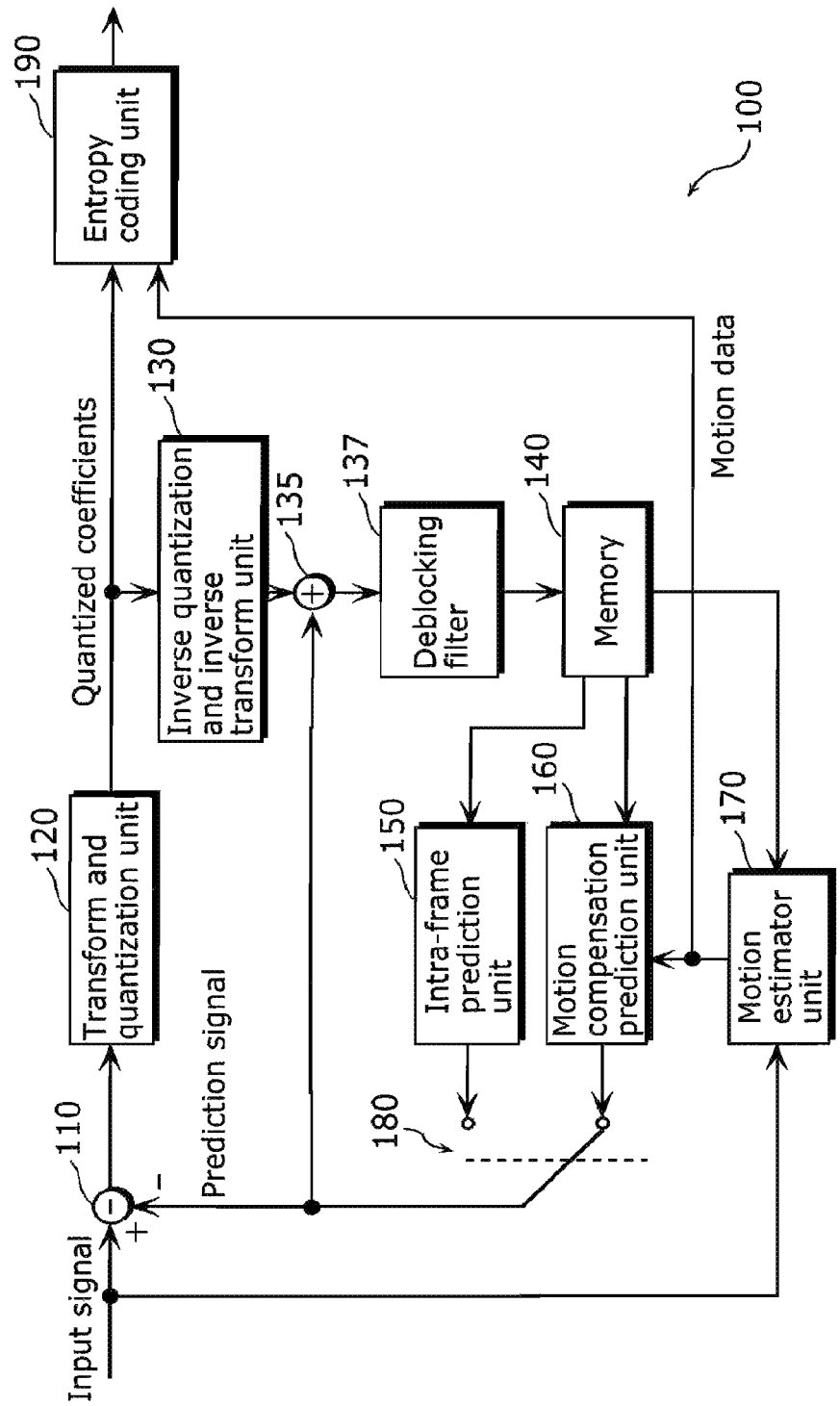
FIG. 1 is a block diagram illustrating a structure of a moving picture coding apparatus of the prior art.
Figure 2:
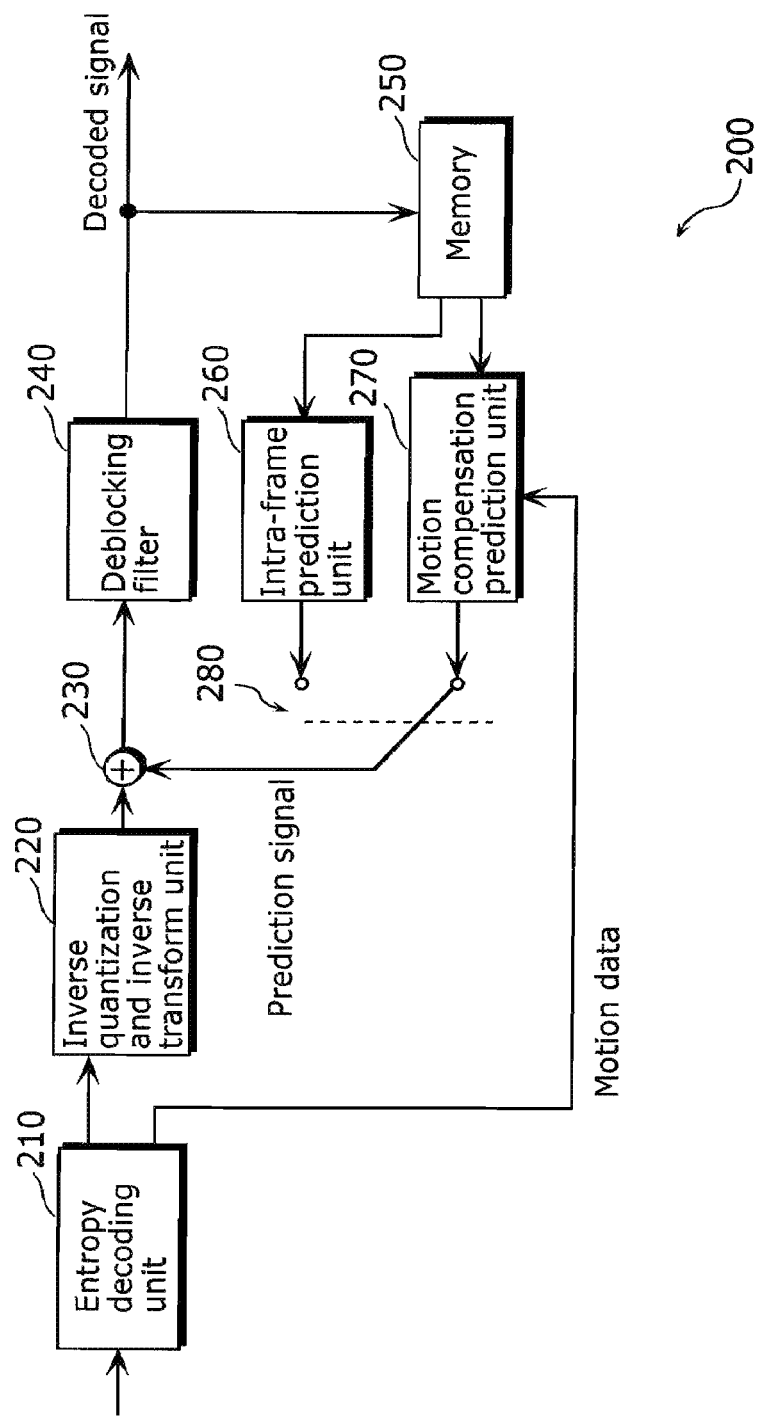
FIG. 2 is a block diagram illustrating a structure of a moving picture decoding apparatus of the prior art.
Figure 3:
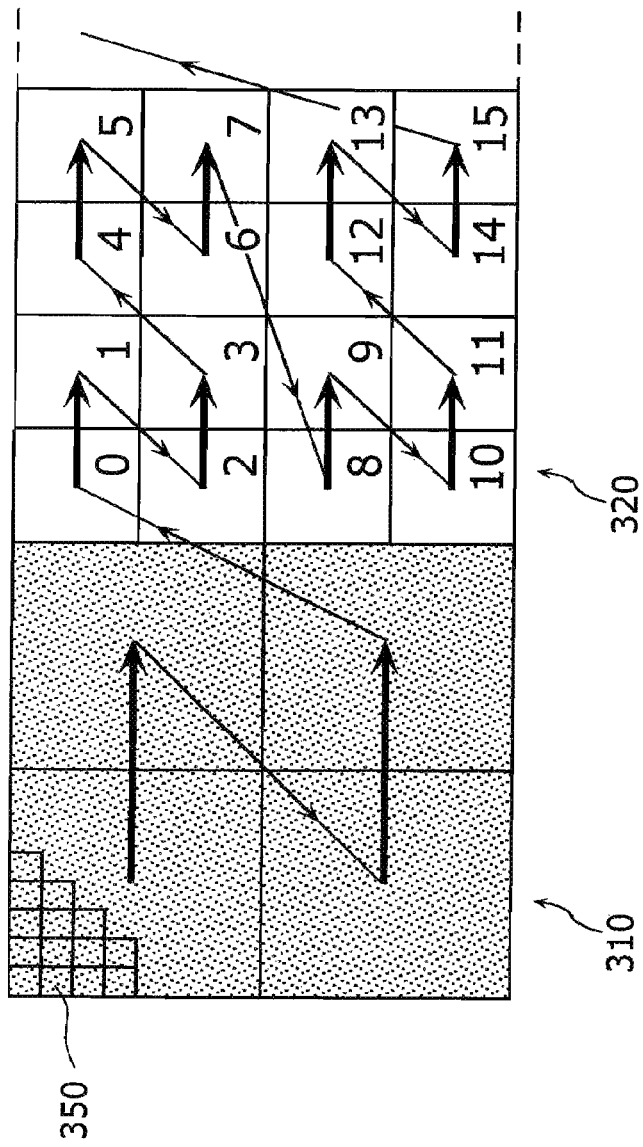
FIG. 3 illustrates block scanning according to the H.264/AVC standard.

1 Moving picture coding apparatus
2 Decoding apparatus
5 Adder
7 Deblocking filter
8 Frame memory
9 Edge direction detection unit
10 Scanning scheme selection unit
11 Subtractor
12 Transform and quantization unit
13 Inverse quantization and inverse transform unit
14 Memory
15 Intra-frame prediction unit
16 Motion compensation prediction unit
17 Motion estimator unit
18 Intra/Inter switch
19 Entropy coding unit
20 Scanning scheme selection unit
21 Entropy decoding unit
22 Inverse quantization and inverse transform unit
23 Adder
24 Deblocking filter
25 Memory
26 Intra-frame prediction unit
27 Motion compensation prediction unit
29 Edge direction detection unit
700 Bit stream
710 Scanning scheme identifier
720 Partitioning information
730 Block data
740 Macroblock header

DETAILED DESCRIPTION OF THE INVENTION

First Embodiment

A feature of the present invention is to select a scanning scheme in order to make more or different reference pictures available in intra-frame prediction. Therefore, the moving picture coding method according to the present invention is a moving picture coding method for coding a moving picture which includes pictures, the method including: partitioning a picture into blocks each of which includes pixels; selecting a scanning scheme from among plural scanning schemes; scanning the blocks according to the selected scanning scheme; and coding the blocks in an order in which the blocks are scanned.

With this, with a coding apparatus, more or different reference pictures are made available in intra-frame prediction, and the coding efficiency and the spatial prediction accuracy are improved. Here, the scanning scheme may be selected from a plurality of predefined scanning schemes. The selected scanning scheme may be signaled to a decoding apparatus. Further, the above mentioned block is one of, or both of a macroblock and a block that a macroblock is partitioned into.

The coding apparatus may thus select a scanning scheme other than the scanning scheme of the prior art.

Figure 6:
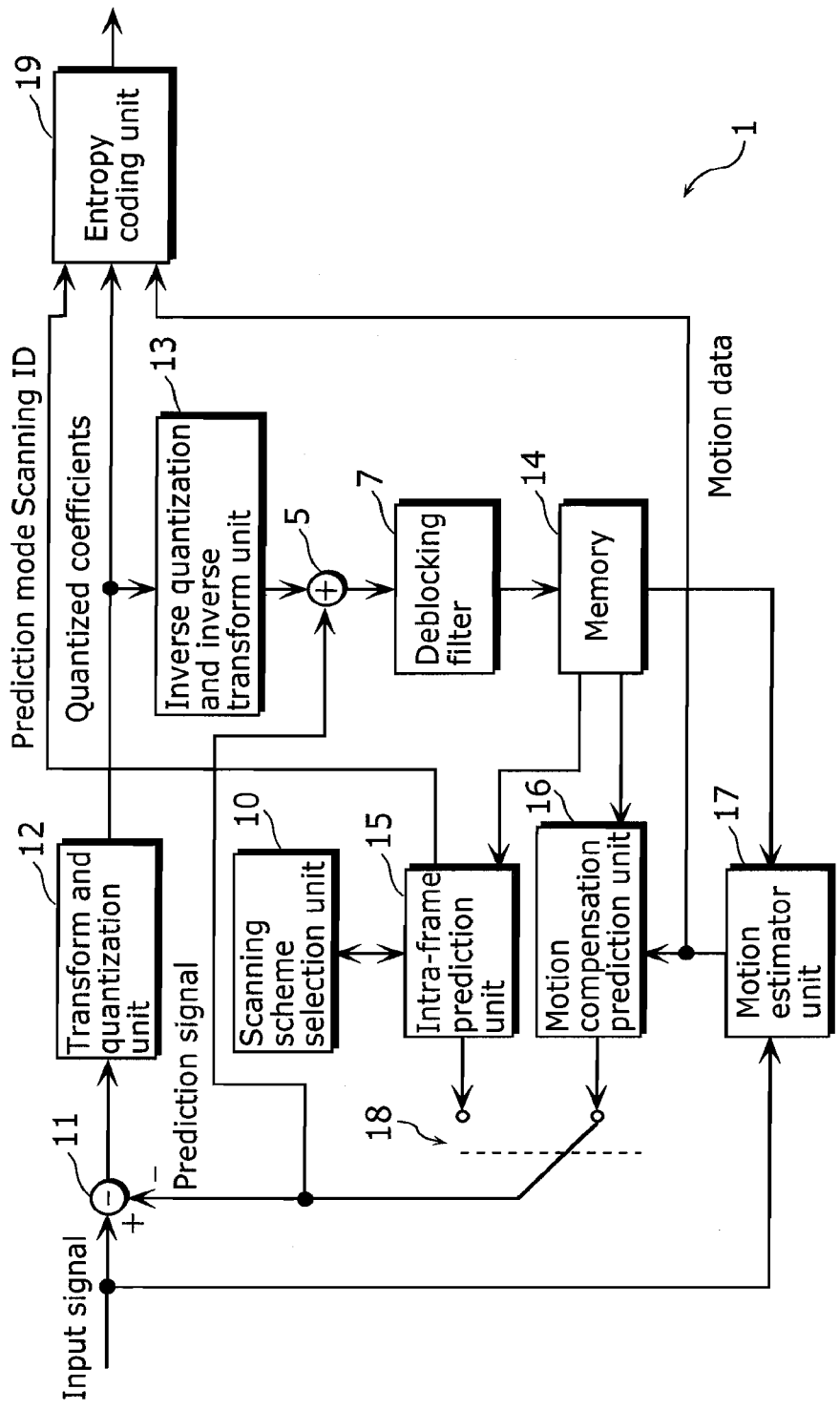
FIG. 6 is a block diagram illustrating a structure of a moving picture coding apparatus according to a first embodiment of the present invention.

FIG. 6 is a block diagram illustrating a structure of a moving picture coding apparatus according to the first embodiment of the present invention. In the figure, a moving picture coding apparatus 1 includes a scanning scheme selection unit 10, a subtractor 11, a transform and quantization unit 12, an inverse quantization and inverse transform unit 13, an adder 5, a deblocking filter 7, a memory 14, an intra-frame prediction unit 15, a motion compensation prediction unit 16, a motion estimator unit 17, an intra/inter switch 18, and an entropy coding unit 19.

The scanning scheme selection unit 10 selects a scanning scheme for macroblocks, a scanning scheme for blocks, and a set of prediction modes. A current macroblock to be coded is scanned according to the selected scanning scheme for macroblocks, and a current block to be coded is scanned according to the selected scanning scheme for blocks.

The subtractor 11 calculates a difference between a current block to be coded and a prediction signal which is based on a coded block stored in the memory 14. The transform and quantization unit 12 transforms a prediction error obtained from the subtractor 11 from the spatial domain to the frequency domain and quantizes the obtained transform coefficients. The entropy coding unit 19 entropy codes the quantized transform coefficients.

In accordance with the H.264/AVC standard, the input image is partitioned into macroblocks which are further partitioned into blocks. The moving picture coding apparatus 1 only transmits differences between blocks of an input moving picture sequence and their predictions based on previously coded blocks ("the locally decoded image"). These differences are determined in the subtractor 11, which receives the blocks to be coded in order to subtract the prediction signal therefrom.

The locally decoded image is provided by a local decoding unit (the inverse quantization and inverse transform unit 13, the adder 5, and the deblocking filter 7) incorporated into the moving picture coding apparatus 1. The local decoding unit performs the coding steps in reverse manner. The inverse quantization and inverse transform unit 13 dequantizes the quantized coefficients and applies an inverse transform to the dequantized coefficients. In the adder 5, the differences obtained by the inverse transform are added to the prediction signal to form the locally decoded image. Further, the deblocking filter 7 reduces block noise in the decoded image.

The type of prediction that is employed by the moving picture coding apparatus 1 depends on whether the macroblocks are coded in "Intra" or "Inter" mode. In "Intra" mode, a prediction scheme based on already coded blocks of the same image is used in order to predict subsequent macroblocks. This prediction scheme employs a prediction mode set selected by the scanning scheme selection unit 10. In "Inter" mode, motion compensation/prediction between corresponding blocks of several consecutive frames is employed.

A switch between Intra-mode, that is, the processing performed by the intra-frame prediction unit 15, and Inter-mode, that is, the processing performed by the motion compensation prediction unit 16, is controlled by the intra/inter switch 18.

In "Inter" mode, a macroblock is predicted from blocks of previous frames by employing motion compensation. The motion prediction is accomplished by the motion estimator unit 17 which receives the current input signal and the locally decoded image. Motion estimation yields two-dimensional motion vectors which represent a pixel motion between the current block and the corresponding block in previous frames. Based on the estimated motion, the motion compensation prediction unit 16 provides a prediction signal.

For both the "Intra" and the "Inter" coding modes, the differences between the current signal and the predicted signal are transformed into transform coefficients by the transform and quantization unit 12. Generally, an orthogonal transform such as a two-dimensional Discrete Cosine Transform (DCT) or an integer version thereof is employed.

The transform coefficients are quantized in order to reduce the amount of data that has to be coded. The step of quantization is controlled by quantization tables that specify the precision and the number of bits that are used to code each frequency coefficient. Lower frequency components are usually more important for image quality than fine details so that more bits are spent for coding the low frequency components than for the higher frequency components.

For reconstructing the coded images by the decoding apparatus, the coding process is applied in reverse manner.

Next, the following shall describe a scanning scheme for macroblocks, a scanning scheme for blocks, and a set of prediction modes selected by the scanning scheme selection unit 10.

A scanning scheme for macroblocks is selected by the scanning scheme selection unit 10 from the following schemes (i) to (v), for example.

Figure 9:
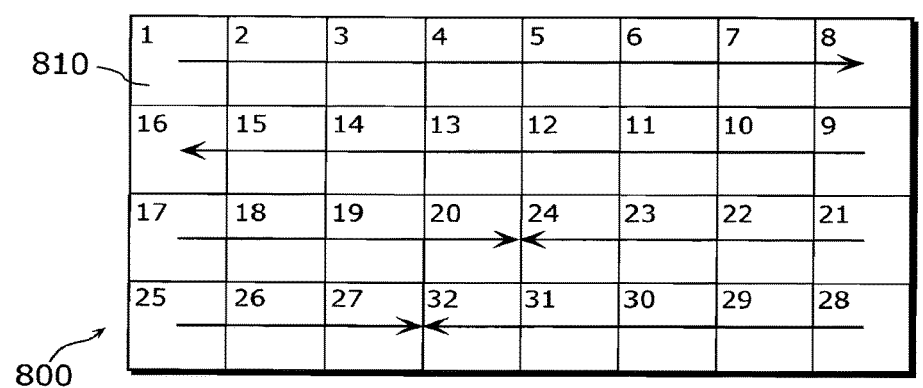
FIG. 9 is a diagram illustrating an example of an order of scanning macroblocks in a frame.

(i) Scanning scheme of scanning from left to right
(ii) Scanning scheme of scanning from right to left
(iii) Scanning scheme of scanning downwards
(iv) Scanning scheme of scanning upwards
(v) Scanning scheme in which the above (i) to (iv) are mixed in a picture (see FIG. 9)

Note that the scanning scheme selection unit 10 may select one of the above (i) to (v) as a fixed scanning scheme, or select one of at least two of the above (i) to (v).

There are mainly two cases for block scanning, that is, (a) scanning in a single macroblock, and (b) scanning beyond a border of two or more macroblocks which are adjacent in the same direction. Determination of a scanning scheme for blocks depends on a combination of: (a) or (b); one of the above described (i) to (iv); and a starting-point block. Candidates for a scanning scheme for blocks to be selected include the following. Note that the letters in the following parentheses denote one of (a) and (b), one of the above described (i) to (iv), and a block position serving as a starting point (u, d, l, and r denote starting points: upper, lower, left, and right, respectively).

(a-i-u) Scanning scheme of scanning from left to right, starting from an upper-left block in a macroblock. (see FIG. 7A)

(a-i-d) Scanning scheme of scanning from left to right, starting from a lower-left block in a macroblock.

(a-ii-u) Scanning scheme of scanning from right to left, starting from an upper-right block in a macroblock.

(a-ii-d) Scanning scheme of scanning from right to left, starting from a lower-right block in a macroblock.

(a-iii-l) Scanning scheme of scanning downwards, starting from an upper-left block in a macroblock.

(a-iii-r) Scanning scheme of scanning downwards, starting from an upper-right block in a macroblock.

(a-iv-l) Scanning scheme of scanning upwards, starting from a lower-left block in a macroblock.

(a-iv-r) Scanning scheme of scanning upwards, starting from a lower-right block in a macroblock.

(b-i-u) Scanning scheme of scanning from left to right, starting from an upper-left block in two or more horizontally adjacent macroblocks.

(b-i-d) Scanning scheme of scanning from left to right, starting from a lower-left block in two or more horizontally adjacent macroblocks.

(b-ii-u) Scanning scheme of scanning from right to left, starting from an upper-right block in two or more horizontally adjacent macroblocks.

(b-ii-d) Scanning scheme of scanning from right to left, starting from a lower-right block in a macroblock in two or more horizontally adjacent macroblocks.

(b-iii-l) Scanning scheme of scanning downwards, starting from an upper-left block in a macroblock in two or more vertically adjacent macroblocks.

(b-iii-r) Scanning scheme of scanning downwards, starting from an upper-right block in a macroblock in two or more vertically adjacent macroblocks.

(b-iv-l) Scanning scheme of scanning upwards, starting from a lower-left block in two or more vertically adjacent macroblocks.

(b-iv-r) Scanning scheme of scanning upwards, starting from a lower-right block in two or more vertically adjacent macroblocks. Note that the scanning scheme selection unit 10 may select one of at least two scanning schemes among the above (a-i-d) to (b-iv-r).

Prediction mode sets include the following (1) to (8), and an optimal set corresponding to a scanning scheme for macroblocks or blocks is selected.

(1) The prediction mode set illustrated in FIG. 10A, corresponding to the scanning scheme of scanning downwards from an upper-left block (the above (a-iii-l) and (b-iii-l).
(2) The prediction mode set illustrated in FIG. 10B, corresponding to the scanning scheme of scanning downwards from an upper-right block (the above (a-iii-r) and (b-iii-r).
(3) The prediction mode set illustrated in FIG. 10C, corresponding to the scanning scheme of scanning from right to left from an upper-right block (the above (a-ii-u) and (b-ii-u).
(4) The prediction mode set illustrated in FIG. 10D, corresponding to the scanning scheme of scanning from right to left from a lower-right block (the above (a-ii-d) and (b-ii-d).
(5) The prediction mode set illustrated in FIG. 10E, corresponding to the scanning scheme of scanning upwards from a lower-left block (the above (a-iv-l) and (b-iv-l).
(6) The prediction mode set illustrated in FIG. 10F, corresponding to the scanning scheme of scanning upwards from a lower-right block (the above (a-iv-r) and (b-iv-r).
(7) The prediction mode set illustrated in FIG. 10G, corresponding to the scanning scheme of scanning from left to right from a lower-left block (the above (a-i-d) and (b-i-d).
(8) The prediction mode set illustrated in FIG. 10H, corresponding to the scanning scheme of scanning from left to right from an upper-left block (the above (a-i-u) and (b-i-u).

Figure 4A:
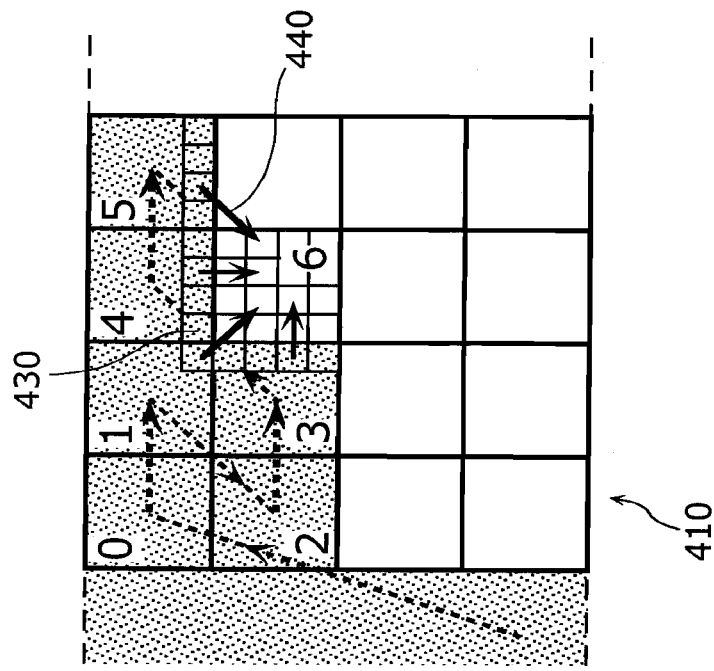
FIG. 4A illustrates intra-prediction of a macroblock specified in the H.264/AVC standard.
Figure 4B:
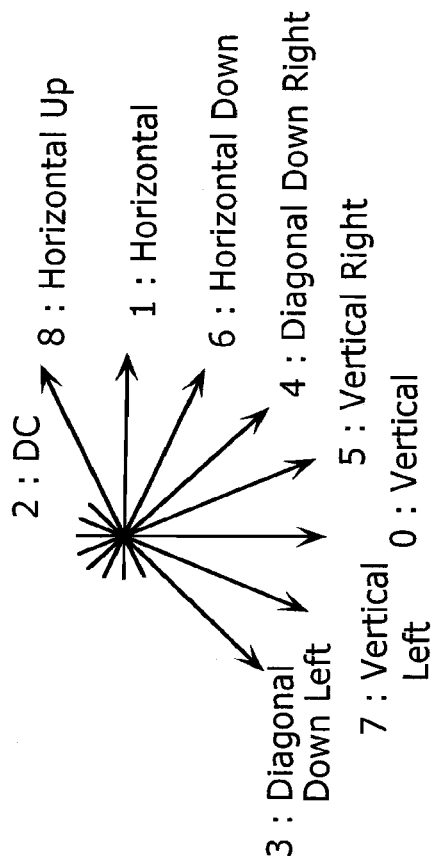
FIG. 4B summarizes the nine different prediction modes defined in the H.264/AVC standard.

Note that the shaded area in FIGS. 10A to 10H represents previously coded blocks, whereas non-shaded area represents blocks yet to be coded. For each prediction mode set, a single DC mode and eight prediction modes indicating eight different prediction directions (arrows in the figures) are available. Further, FIG. 10H illustrates the same prediction mode set as that in FIG. 4B.

Figure 7A:
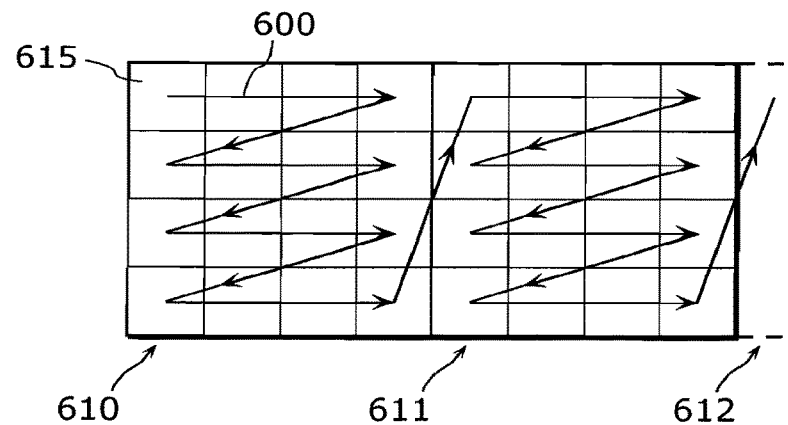
FIG. 7A is a diagram illustrating a first scanning scheme for blocks according to an embodiment of the present invention.
Figure 7B:
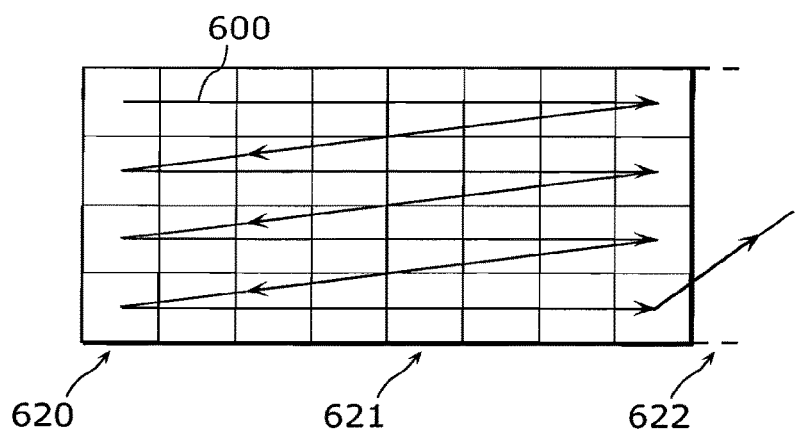
FIG. 7B is a diagram illustrating a second scanning scheme for blocks according to an embodiment of the present invention.
Figure 7C:
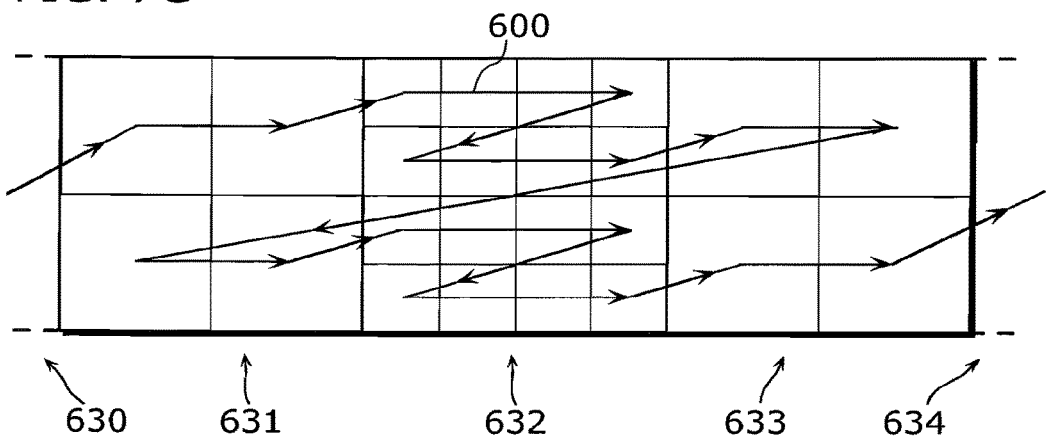
FIG. 7C is a diagram illustrating a third scanning scheme for blocks according to an embodiment of the present invention.

FIGS. 7A to 7C illustrate an improved scanning scheme (600) in which more reference pixels are provided for intra-prediction.

FIG. 7A illustrates a scanning scheme (600), where a row of macroblocks (610, 611, 612) is scanned by scanning the blocks 615 of each macroblock per row of blocks. After scanning the blocks of a first macroblock (610), the scan jumps to the upper-left block of the next macroblock (611), and so forth.

Figure 5A:
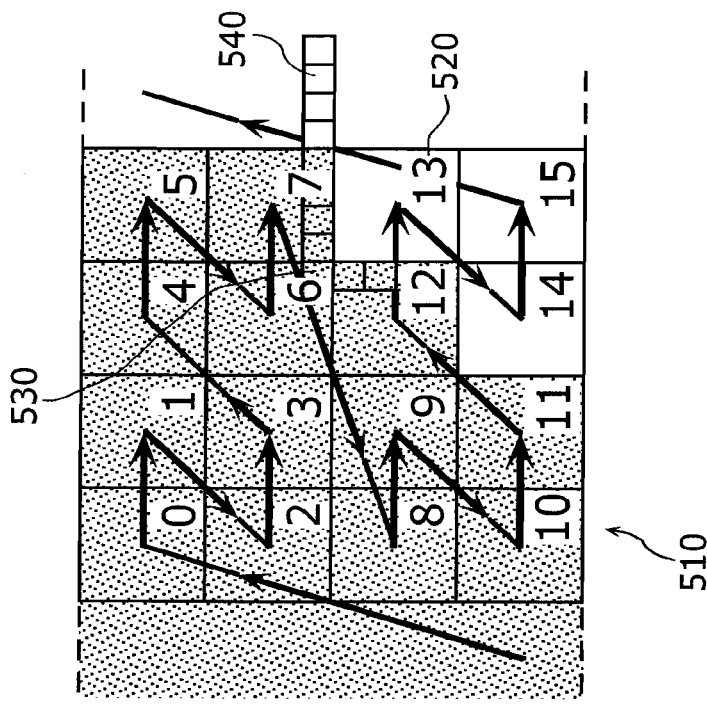
FIG. 5A is a diagram illustrating reference pixels available in intra-prediction.

Consequently, cases where reference pixels are missing due to the conventional scanning order as shown in FIG. 5A are eliminated. This leads to a more accurate prediction of moving picture data from previously coded blocks and hence to an improved coding efficiency.

FIG. 7B illustrates scanning a row of macroblocks including two I4MBs (620 and 621) followed by an I16MB (622). Blocks from macroblocks with the same partitioning, that is, blocks of the same size, are scanned per row of blocks, irrespective of macroblock borders. The scan stops and jumps to the next row, when a macroblock (622) with a different partitioning is reached. As soon as all blocks of the of the same size are scanned, blocks of the next macroblock (622) are scanned.

Figure 5B:
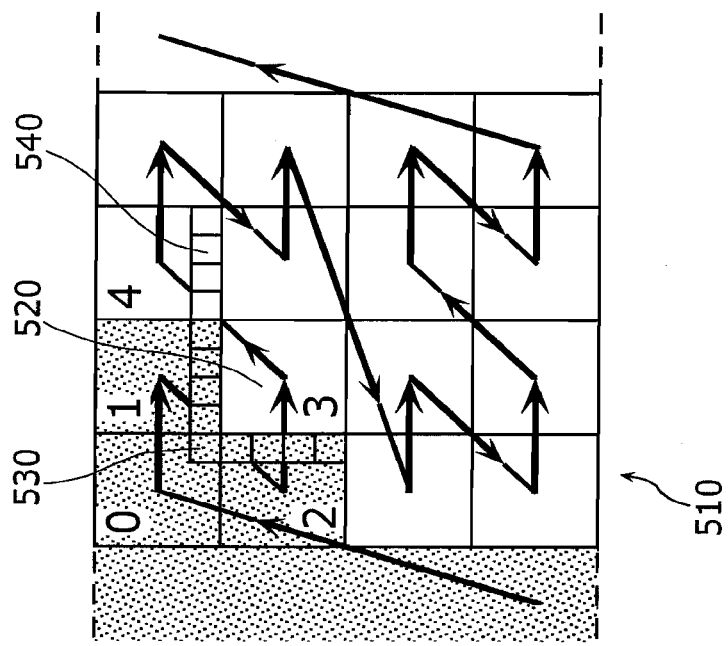
FIG. 5B is a diagram illustrating reference pixels available in intra-prediction.

Consequently, cases where reference pixels are missing due to the conventional scanning order as shown in FIG. 5A are eliminated. Moreover, cases where reference pixels are missing due to macroblock boundaries (see FIG. 5B) are reduced. This leads to a more accurate prediction of moving picture data from previously coded blocks and hence to an improved coding efficiency.

The scanning order of blocks of different macroblock partitions is a little different. To illustrate this, an example for the scanning order of blocks in macroblocks with different partitions is shown in FIG. 7C. If the scan reaches the macroblock border and the adjacent block of the next macroblock is smaller than or equal to the size of the current block, then the adjacent block is the next block in the scanning order. If the adjacent block of the next macroblock is bigger than the current block, then the next row of blocks of the macroblock needs to be scanned. In other words, if the reference pixels for the next block of the next macroblock have not been coded yet, scan the next row.

Consequently, cases where reference pixels are missing due to the conventional scanning order as shown in FIG. 5A are eliminated. Moreover, cases where reference pixels are missing due to macroblock boundaries (see FIG. 5B) are reduced. This leads to a more accurate prediction of moving picture data from previously coded blocks and hence to an improved coding efficiency.

Although the scanning order in the above examples is horizontal left-to-right, the present invention is not restricted in this respect. Instead, the present invention can also be carried out with the scanning order being inverted, mirrored, or rotated.

The above described scanning schemes are examples for improved scanning schemes that can be selected by the coding apparatus according to the present invention. However, any of these scanning schemes could also be employed by an improved coding apparatus without an explicit selecting step.

The H.264/AVC standard is based on partitioning the blocks in macroblocks. In the H.264/AVC standard, each macroblock may be further partitioned into blocks according to one out of three possible macroblock partitions. The present invention, however, is not restricted to a macroblock structure. Instead, the present invention may be applied to different partitions and even to partitions with varying block shapes and sizes.

For decoding the coded moving picture data, the decoding apparatus needs information on the sequence in which the blocks have been coded by the coding apparatus. Therefore, the scanning scheme employed by the coding apparatus has to be signaled to the decoding apparatus. According to another aspect of the present invention, the signaling to the decoding apparatus is achieved by inserting a scanning scheme identifier into the coded moving picture data. The scanning scheme identifier identifies the scan applied by the coding apparatus. The decoding apparatus detects the scanning scheme identifier from the coded moving picture data and can hence perform the inverse-scanning of the decoded blocks.

Figure 8A:
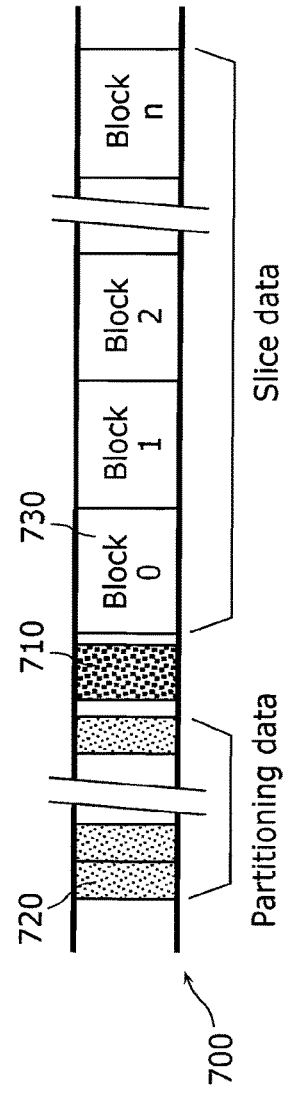
FIG. 8A illustrates a structure of a bit stream which includes a scanning ID in every slice.
Figure 8B:
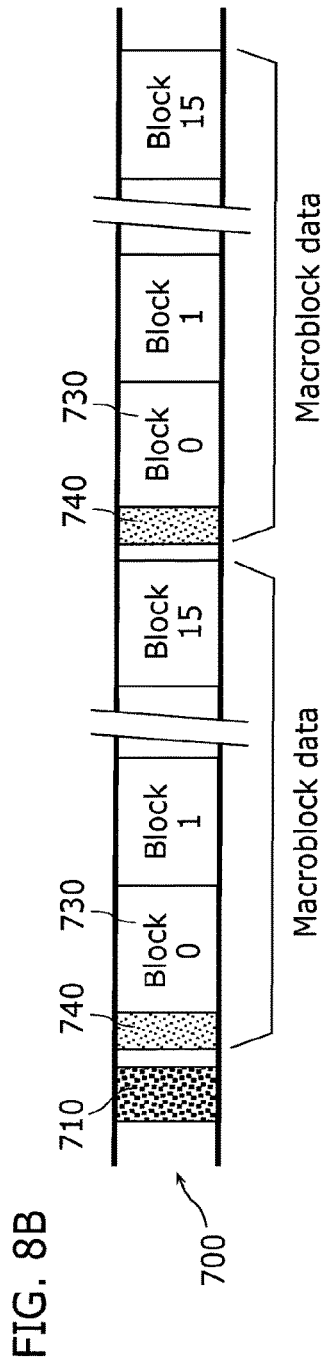
FIG. 8B illustrates a structure of a bit stream which includes, for every macroblock, a scanning ID of blocks.
Figure 8C:
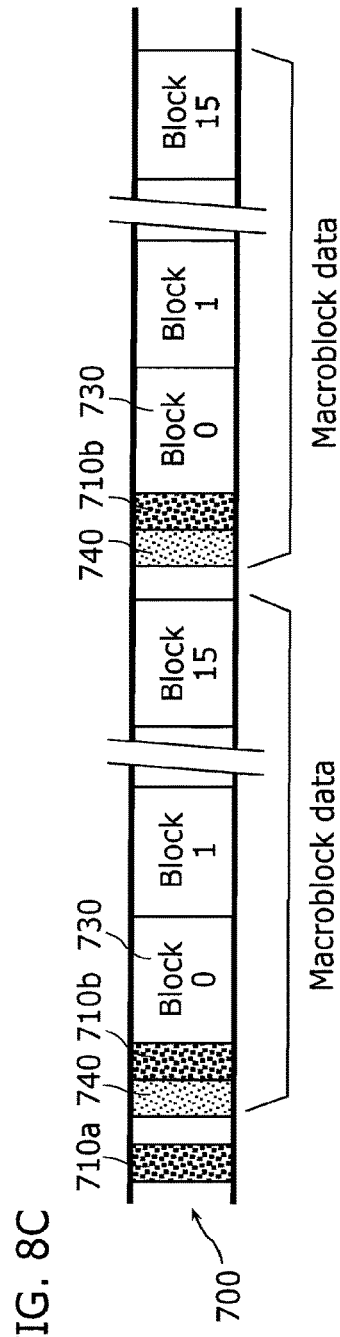
FIG. 8C illustrates a structure of a bit stream which includes, for every macroblock, a scanning ID of a macroblock and a scanning ID of blocks.

FIGS. 8A to 8C illustrate the structure of a bit stream representing the coded moving picture data. In FIG. 8A, a bit stream 700 includes information 720 on the macroblock partition of all macroblocks of the present slice. This information defines the partition of the moving picture data into a plurality of blocks. This information is followed by a scanning scheme identifier 710 which identifies the scanning scheme that is applied by the coding apparatus to scan the plurality of blocks. In accordance with this scanning scheme, the scanning scheme identifier 710 is followed by block data 730.

In the above example, the scanning scheme is selected and signaled on slice level. The present invention, however, is not restricted in this respect. The scanning scheme can be selected and signaled on profile, level, frame, field, or even on macroblock level.

FIG. 8B illustrates signaling of the scanning scheme on macroblock level. A bit stream 700 includes a scanning scheme identifier 710 that identifies the scanning scheme that is employed for all consecutive macroblocks until another scanning scheme identifier is inserted into the bit stream. The scanning scheme identifier 710 is followed by a plurality of macroblock data items, each including a macroblock header 740 and the corresponding block data items 730. The macroblock header 740 includes, for instance, information on the macroblock partition.

In order to identify the scanning scheme, the scanning scheme identifier may include a reference to one of a plurality of predefined scanning schemes. Alternatively, the scanning scheme identifier explicitly includes information on the sequence in which the blocks have been scanned. In this case, the coding apparatus is completely free to select the scanning scheme. That is, the set of predefined scanning schemes includes all possible scanning orders.

The scanning scheme may also be defined hierarchically according to the macroblock/block structure. In a first step, the scanning order of the macroblocks is defined. The scanning order of the blocks within each macroblock is then defined in a second step.

FIG. 8C illustrates signaling of the hierarchical scanning scheme in two steps. A bit stream 700 includes a first scanning scheme identifier 710*a* that identifies the scanning order of the macroblocks. This step of signaling may occur, for instance, on the level of the current frame or the current slice. Having thus defined the order in which the macroblocks are treated, the scanning scheme for the blocks within each macroblock is signaled by a second scanning scheme identifier 710*b*. This scanning scheme identifier may explicitly be part of each macroblock data item, as shown in the illustration, or may be inserted into the bit stream only upon a change of the scanning scheme for blocks within a macroblock.

Instead of signaling the scanning scheme for blocks within a macroblock explicitly, the scanning scheme may also be derived implicitly from the macroblock scanning order.

FIG. 9 is a diagram illustrating an example of a scanning order of macroblocks. The figure shows a moving picture frame (800) partitioned into 8×4 macroblocks (810). Numerals indicate the scanning order of the macroblocks, and arrows indicate the scanning direction of the blocks within each macroblock. Hence, if macroblocks are scanned from left to right, the blocks within each macroblock are also scanned from left to right in order to provide more reference pixels for intra-prediction. An analogous rule holds for other scanning directions. In this scenario, it is not necessary to signal the scanning scheme for blocks within a macroblock explicitly. It suffices to signal, for example, the initial scanning direction of macroblocks within each slice and the number of macroblocks that are scanned in the same direction. In this manner, the coding efficiency can be further improved.

Although the above example relates to horizontal scanning, the present approach is not limited in this respect. The present invention can also be applied to other scanning directions, as well as to other starting points of the scan.

The direction, in which the blocks are scanned, affects the reference pixels that are available for intra-prediction. According to another aspect of the present invention, the set of prediction modes that can be employed for predicting a block of moving picture data can hence be adapted to the scanning direction.

The above described FIGS. 10A to 10H illustrate prediction mode sets depending on the scanning direction of blocks.

The set of directions that is available for a given scanning direction depends on the reference pixels that are available from previously scanned blocks (shaded area) and hence on the scanning direction.

In this manner, there is no need to provide a code word for each of the 16 possible prediction directions. Hence, the prediction direction can be coded with less bits and coding efficiency can be improved.

On the other hand, the reference pixels that are employed for prediction can be controlled by the scanning direction. Depending on the image content, the accuracy of the prediction depends on the prediction direction. For instance, a block of image data may be predicted more accurately, if its pixels are extrapolated from right to left rather than in the opposite direction. Hence, the coding apparatus may adapt the scanning scheme to the image content by reversing the conventional scanning direction. In this manner, reference pixels to the right of the current block become available for intra-prediction. Prediction accuracy and coding efficiency can thus be improved by employing the "right-to-left" prediction mode.

Adapting the scanning scheme to the image content is particularly important for multi-pass coding, where the coding apparatus analyzes image content in a first pass for adapting the scanning scheme in a second pass. Alternatively, the coding apparatus may code the moving picture data by way of trial with several different scanning schemes and select the scanning scheme that delivers the best results with respect to coding efficiency, for example.

Figure 11:
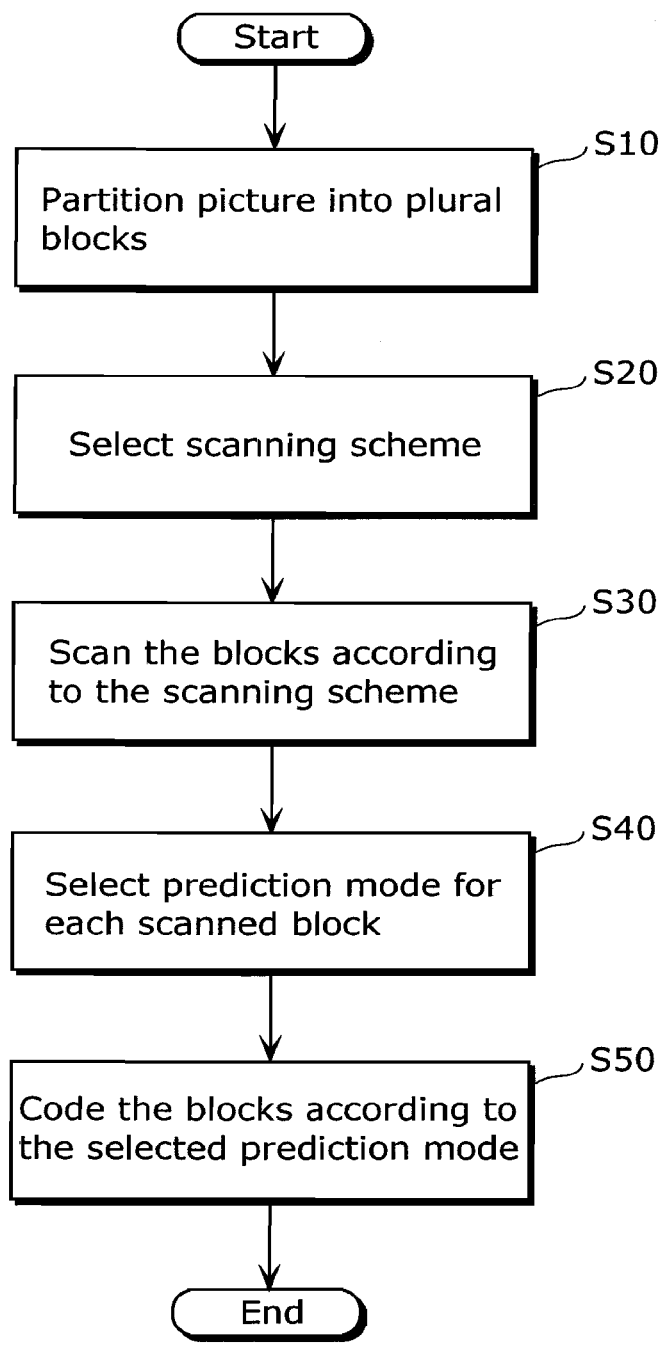
FIG. 11 is a flow chart illustrating operations of a coding apparatus.

FIG. 11 is a flow chart illustrating operations of the coding apparatus according to the present invention. In Step S10, an input picture such as a moving picture frame or field or a subset thereof, is partitioned into a plurality of blocks. The data of each of these blocks is then compressed and coded. In Step S20, the scanning scheme selection unit 10 selects a scanning scheme for macroblocks, a scanning scheme for blocks, and a prediction mode set. For example, the scanning scheme selection unit 10 directs the intra-frame prediction unit 15 to test intra-prediction with several combinations of a scanning scheme for macroblocks, a scanning scheme for blocks, and a prediction mode set, and selects the combination which delivers the least prediction error. The order by which the blocks are coded is defined by the scanning scheme selected in Step S20. In order to allow the decoding apparatus to reconstruct the picture, a scanning scheme identifier identifying the selected scanning scheme is inserted into the coded moving picture data. In Step S30, the blocks are scanned in accordance with the selected scanning scheme. In Step S40, a prediction mode is selected for each block for predicting the block from previously scanned blocks. In Step S50, finally, each block is coded according to the selected prediction mode.

Figure 12:
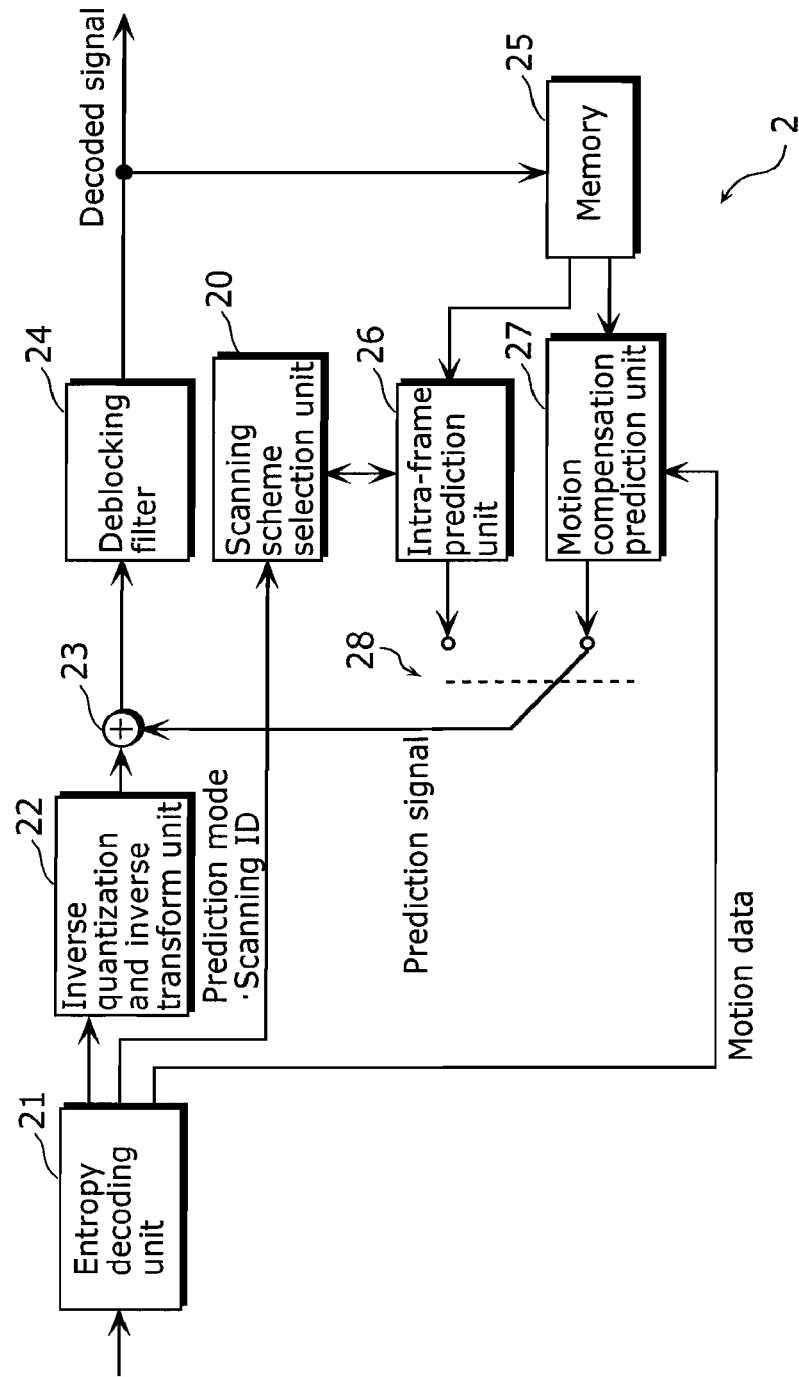
FIG. 12 is a block diagram illustrating a structure of a moving picture decoding apparatus according to the first embodiment of the present invention.

FIG. 12 is a block diagram illustrating a structure of the moving picture decoding apparatus according to the first embodiment of the present invention. A moving picture decoding apparatus 2 in the figure includes a scanning scheme selection unit 20, an entropy decoding unit 21, an inverse quantization and inverse transform unit 22, an adder 23, a deblocking filter 24, a memory 25, an intra-frame prediction unit 26, and a motion compensation prediction unit 27.

For entropy decoding by the entropy decoding unit 21, entropy coding of transform coefficients and motion data by the entropy coding unit 19 is reversed. The entropy decoded block is then submitted to the inverse quantization and inverse transform unit 22, the entropy decoded motion data is sent to the motion compensation prediction unit 27, and the entropy decoded scanning scheme identifier is sent to the scanning scheme selection unit 20.

The scanning scheme selection unit 20 selects a scanning scheme for macroblocks, a scanning scheme for blocks, and a set of prediction modes according to the scanning scheme identifier and so forth.

The prediction errors are added by the adder 23 to the prediction signal stemming from the motion compensation prediction unit 27 in Inter-mode or stemming from the intra-frame prediction unit 26 in Intra-mode. The reconstructed image is passed through the deblocking filter 24 and is stored in the memory 25 to be applied to the intra-frame prediction unit 26 and the motion compensation prediction unit 27.

At that time, the current macroblock to be decoded is scanned according to the selected scanning scheme for macroblocks and scanning scheme for blocks, and is intra-decoded according to the prediction mode set.

Figure 13:
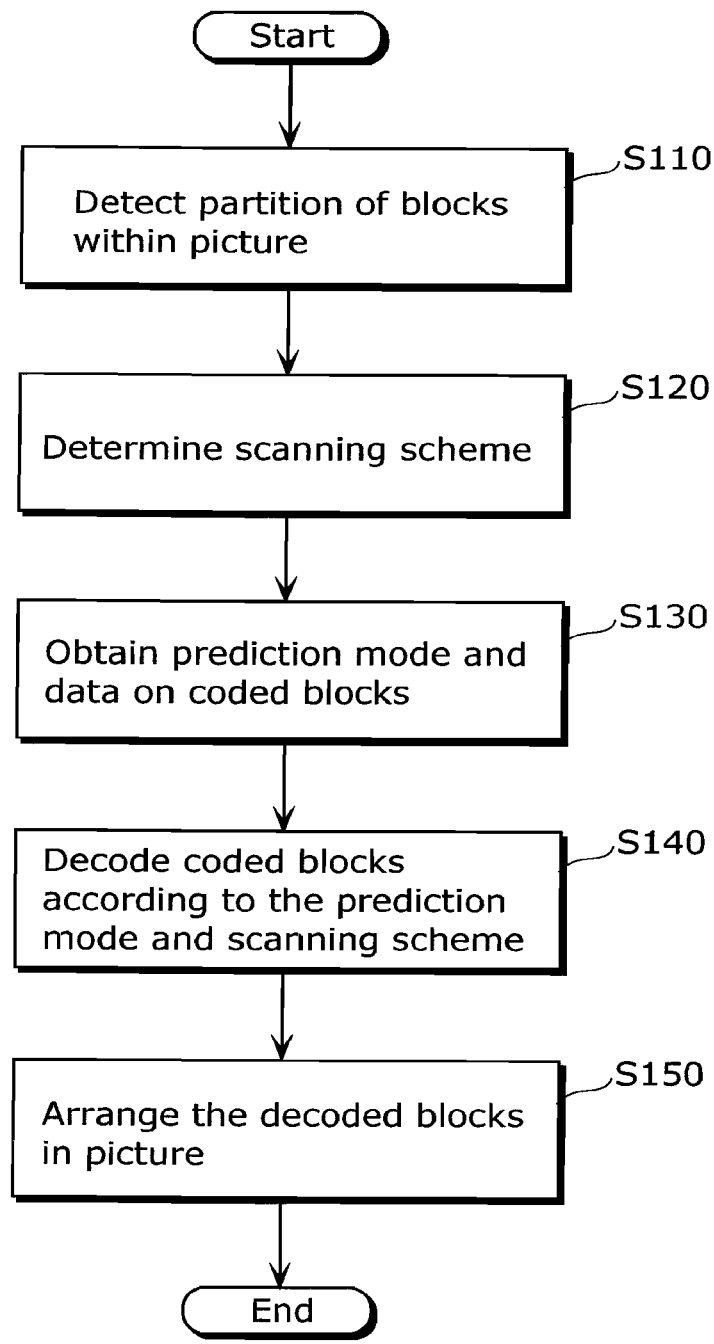
FIG. 13 is a flow chart illustrating operations of a decoding apparatus.

FIG. 13 is a flow chart illustrating operations of the decoding apparatus according to the present invention. In Step S110, a block partition within a picture is detected from the coded moving picture data. This allows the decoding apparatus to reconstruct how the coding apparatus has partitioned the image into blocks, that is, the number, size, and location of blocks. In Step S120, the scanning scheme identifier is detected from the coded moving picture data. This identifier defines the scanning scheme employed by the coding apparatus, that is, the order in which the blocks have been coded. In Step S130, the coded moving picture data and the corresponding prediction mode are received for each block, which is then decoded in Step S140 according to the detected prediction mode and the detected scanning scheme. Finally, in Step S150, the picture is reassembled from the decoded blocks.

As described above, according to the moving picture coding apparatus and the moving picture decoding apparatus in the present embodiment, accuracy of intra-frame prediction is improved by adaptively selecting the order in which blocks are coded, that is, the scanning scheme, so as to provide more reference pixels or reference pixels that are more suitable for predicting the current block. Due to improved prediction accuracy, the amount of residual image data is reduced and coding efficiency improves.

Additionally, coding efficiency is further improved by adapting the available prediction mode sets to the scanning scheme. The scanning order is signaled to the decoding apparatus, which can thus decode each block and reconstruct the moving picture data.

Second Embodiment

In the first embodiment, it is necessary that the moving picture coding apparatus sends a scanning scheme identifier to the moving picture decoding apparatus. In a second embodiment, structures of a moving picture coding apparatus and a moving picture decoding apparatus which are not required to do so shall be described. The moving picture coding apparatus according to the present embodiment detects a direction of an image edge included in a predetermined portion of the picture, and adaptively determines a scanning scheme from among the plural scanning schemes based on the detected edge direction. Similarly, the moving picture decoding apparatus detects a direction of an image edge included in a predetermined portion of the picture, and selects a scanning scheme from among the plural scanning schemes based on the detected edge direction. For the algorithm for detecting the direction of an edge in the predetermined portion and algorithm for selecting a scanning scheme, the moving picture coding apparatus and the moving picture decoding apparatus employ the same processing. With this, it is no longer necessary to include a scanning scheme identifier in the bit stream, and hence the coding efficiency can be further improved.

Figure 14A:
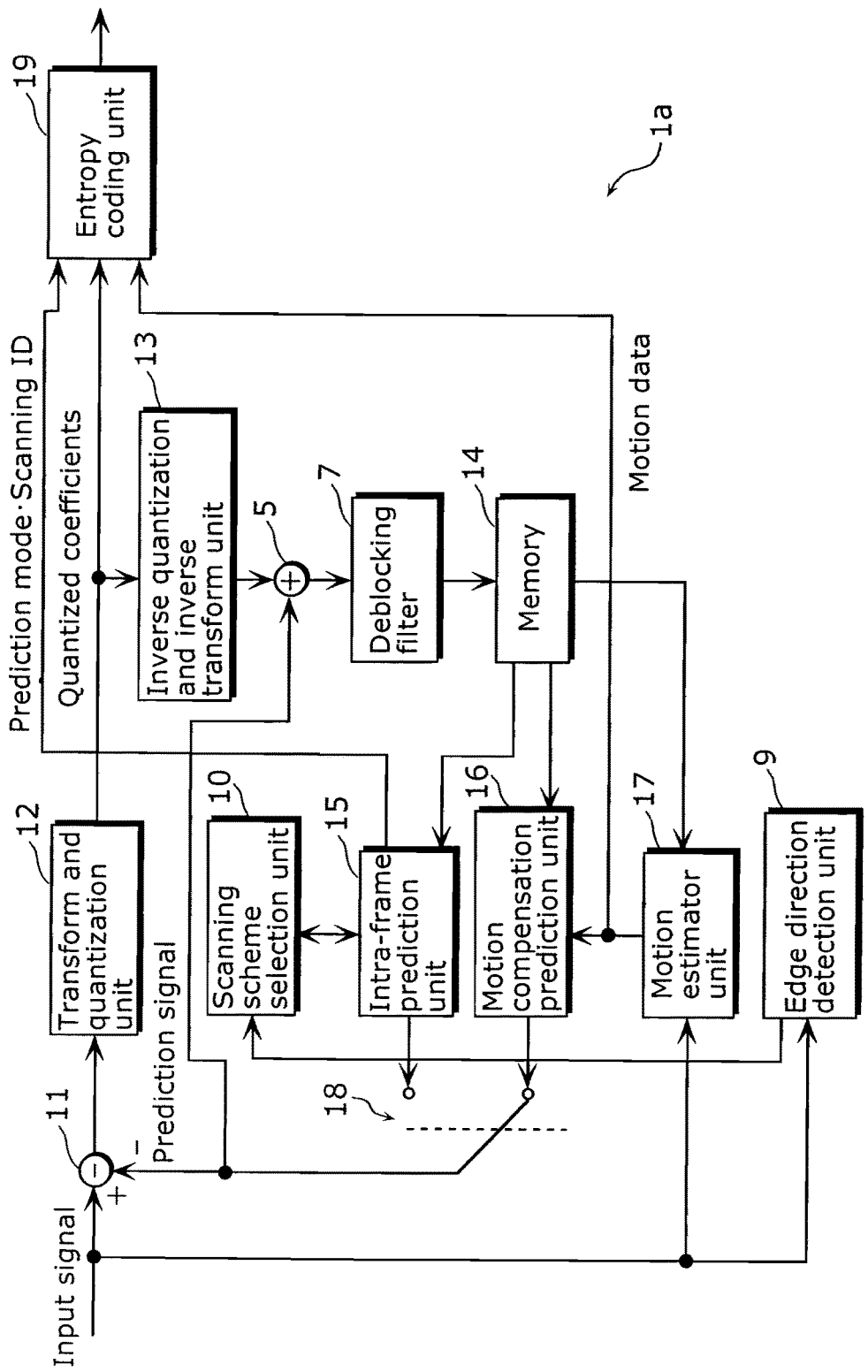
FIG. 14A is a block diagram illustrating a structure of a moving picture coding apparatus according to a second embodiment of the present invention.

FIG. 14A is a block diagram illustrating a structure of a moving picture coding apparatus according to a second embodiment of the present invention. A moving picture coding apparatus 1a in the figure is different from the moving picture coding apparatus in FIG. 6 in that an edge direction detection unit 9 is added. Also, operations of the scanning scheme selection unit 10 are slightly different. The same aspects are omitted from the following description, and mainly different aspects shall be described.

The edge direction detection unit 9 detects the direction of an image edge included in a predetermined portion of a picture held in the memory 14. To be more specific, the edge direction detection unit 9 detects in which direction of the predetermined portion many edges are included. In the present embodiment, it is assumed that the predetermined portion is an initial macroblock row within a picture. Further, the edge direction detection unit 9 also detects the direction of edges in each macroblock row other than the initial macroblock row.

The scanning scheme selection unit 10 is similar to that of the first embodiment in that it selects a scanning scheme for macroblocks, a scanning scheme for blocks, and a prediction mode set. However, the following point is different. That is, the scanning scheme selection unit 10 selects a default scanning scheme and prediction mode set to code the predetermined portion, and selects a scanning scheme that is optimal for the detected edge direction to code the other portions.

Figure 15A:
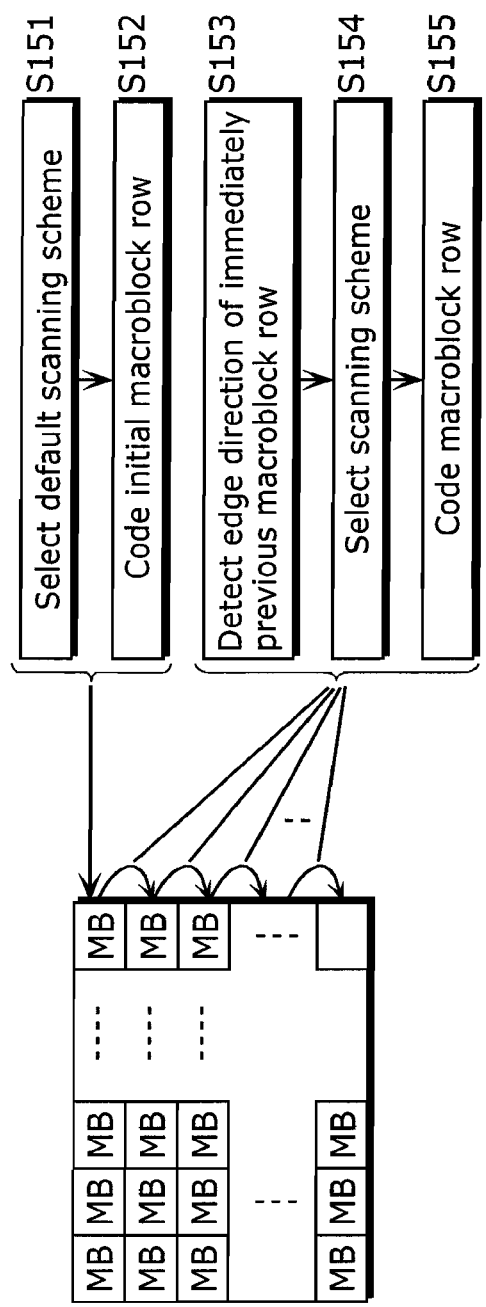
FIG. 15A is a diagram illustrating operations of the coding apparatus.

FIG. 15A is a diagram illustrating operations of the coding apparatus. The figure illustrates the case where the above mentioned predetermined portion is the initial macroblock row. As the figure illustrates, the scanning scheme selection unit 10 selects the same default scanning scheme and prediction mode set as that of a moving picture decoding apparatus, for coding the initial macroblock row within a picture (S151). The intra-frame prediction unit 15 applies intra-prediction on the initial macroblock row according to the default scanning scheme and prediction mode set. As a result, the initial macroblock row is coded using the default scanning scheme and prediction mode set (S152).

Then, the edge direction detection unit 9 detects edges in the image of the immediately previously coded macroblock row, and detects in which direction many edges are included (S153). The scanning scheme selection unit 10 selects a scanning scheme and a prediction mode set that are optimal for the detected edge direction (S154). A macroblock row is coded according to the selected scanning scheme and prediction mode set (S155).

The second macroblock row and the subsequent macroblock rows are sequentially coded according to the above described Steps S153 to S155.

Figure 15B:
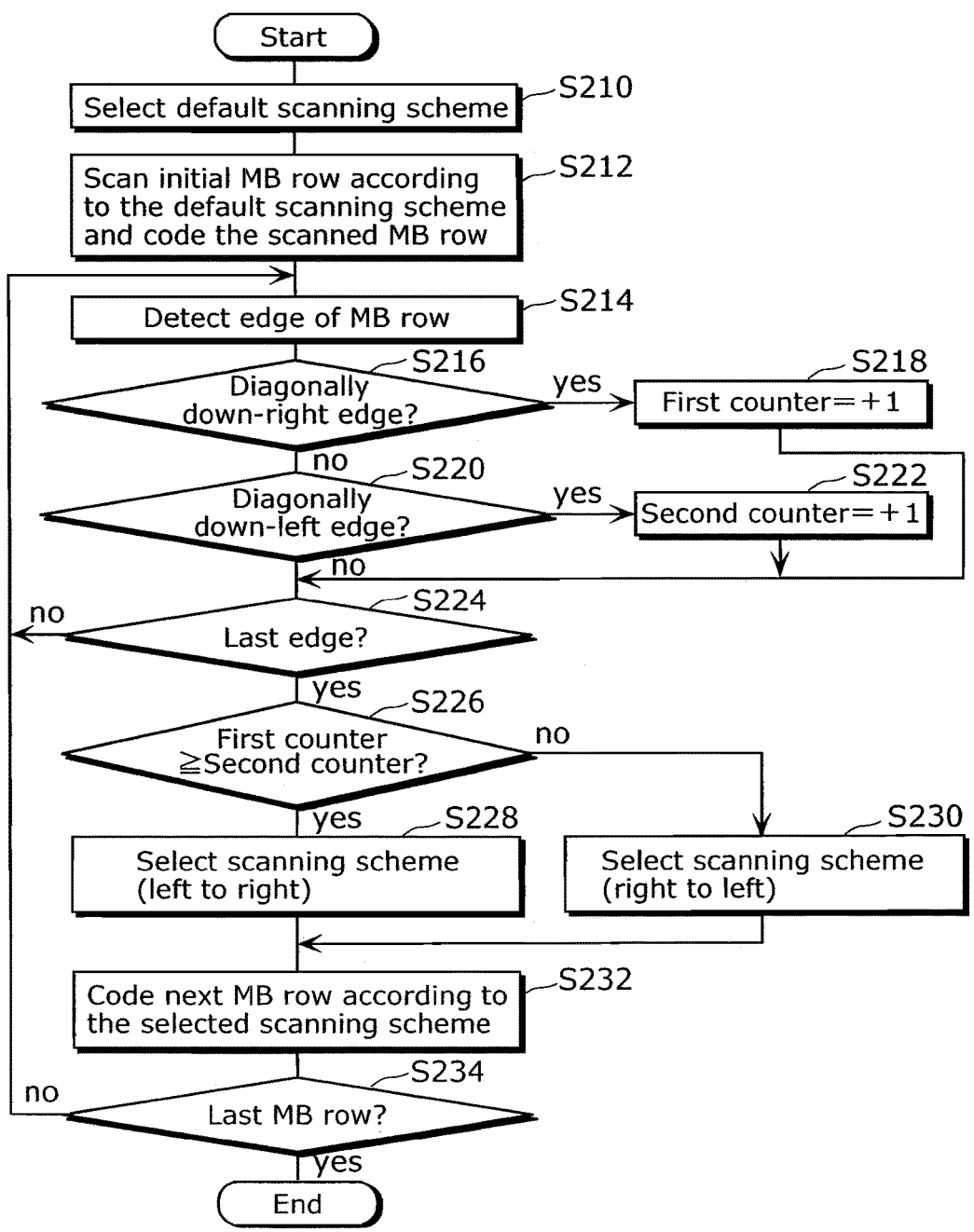
FIG. 15B is a flow chart illustrating operations of the coding apparatus.

FIG. 15B is a detailed flow chart illustrating an example of operations of the coding apparatus. As the figure illustrates, the scanning scheme selection unit 10 selects the same default scanning scheme and prediction mode set as that of the moving picture decoding apparatus, for coding the initial macroblock row within a picture (S210). The intra-frame prediction unit 15 applies intra-prediction on the initial macroblock row according to the default scanning scheme and prediction mode set. As a result, the initial macroblock row is coded using the default scanning scheme and prediction mode set (S212).

Further, the edge direction detection unit 9 sets a first counter and a second counter to 0. Then, the edge direction detection unit 9 detects edges included in an image of the immediately previously coded macroblock row (S214), and increments the first counter by 1 when the detected edge is in the diagonally down-right direction (S216, S218), and increments the second counter by 1 when the detected edge is in the diagonally down-left direction (S220, S222). The edge direction detection unit 9 repeats such counting up to the last edge detected (S224). As a result, the count value of the first counter represents the number of edges in the diagonally down-right direction, and the count value of the second counter represents the number of edges in the diagonally down-left direction.

Next, the scanning scheme selection unit 10 compares the count value of the first counter and the count value of the second counter. More specifically, the scanning scheme selection unit 10 judges which edges, that is, either the edges in the diagonally down-right direction or the edges in the diagonally down-left direction, are in a greater number (S226). When the edges in the diagonally down-right direction are in a greater number, the scanning scheme selection unit 10 selects a scanning scheme of scanning from left to right. For example, the above described (a-i-u) scanning scheme and a corresponding prediction mode set are selected (S228). When the edges in the diagonally down-left direction are in a greater number, the scanning scheme selection unit 10 selects a scanning scheme of scanning from right to left. For example, the above described (a-ii-u) scanning scheme and a corresponding prediction mode set are selected.

The next macroblock row is coded according to the selected scanning scheme and prediction mode set (S232).

The above described Steps S214 to S232 are carried out for every macroblock row except for the initial macroblock row.

With this, for coding the second macroblock row and the subsequent macroblock rows, a scanning scheme and prediction mode set are selected that are optimal for the direction of the edge included in the image of the immediately previous macroblock row.

Figure 16:
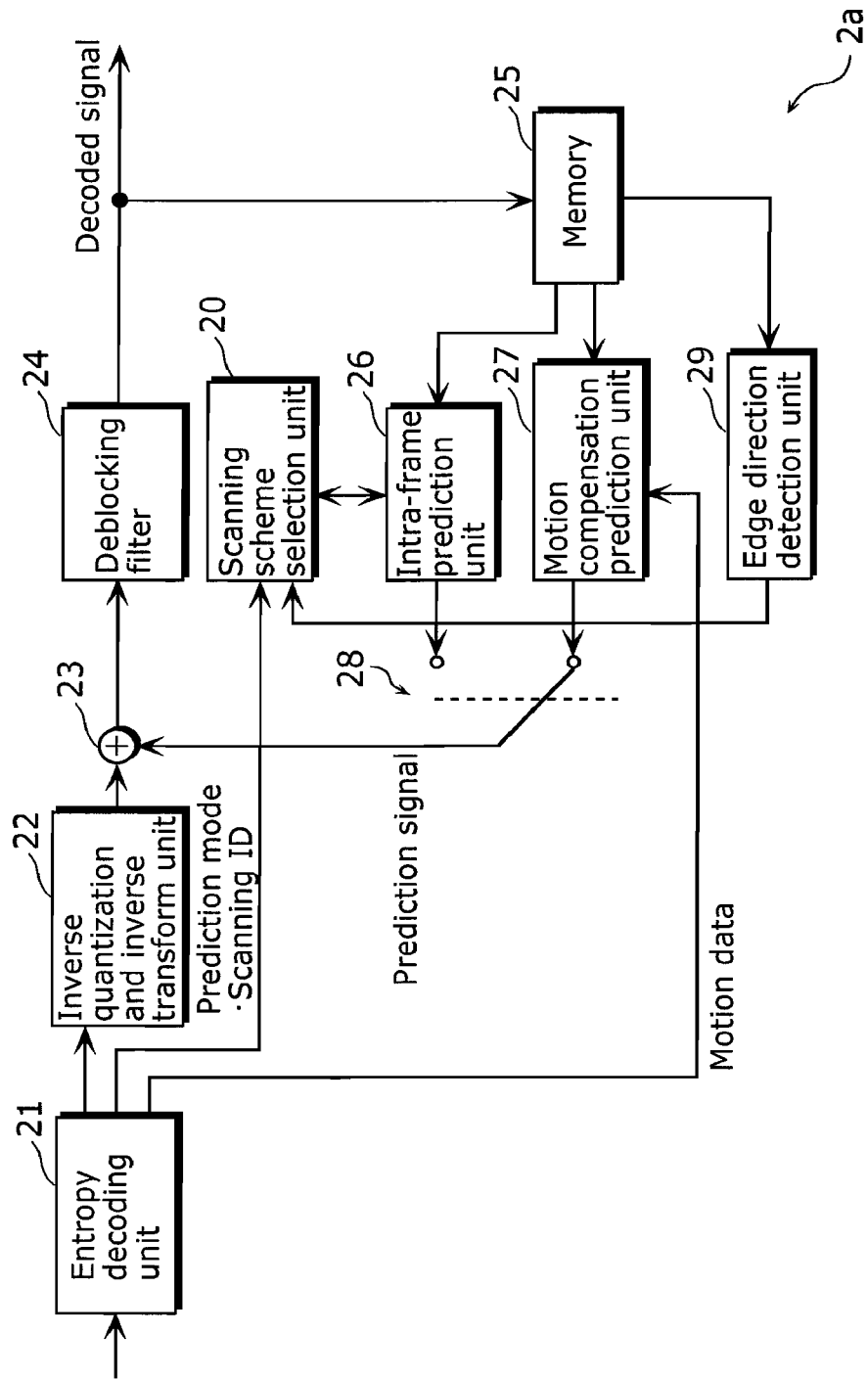
FIG. 16 is a block diagram illustrating a structure of a moving picture decoding apparatus according to the second embodiment of the present invention.

FIG. 16 is a block diagram illustrating a structure of a moving picture decoding apparatus according to the second embodiment of the present invention. A moving picture coding apparatus 2a in the figure is different from the moving picture decoding apparatus in FIG. 12 in that an edge direction detection unit 29 is added. Also, operations of the scanning scheme selection unit 20 are slightly different. The same aspects are omitted from the following description, and mainly different aspects shall be described.

The edge direction detection unit 29 and the scanning scheme selection unit 20 perform their respective processing using the same algorithms of the edge direction detection unit 9 and the scanning scheme selection unit 10, respectively, of the moving picture coding apparatus of the present embodiment. Consequently, it is not necessary for a bit stream to include information that indicates a scanning scheme identifier of macroblocks and blocks and a prediction mode set.

The edge direction detection unit 29 detects the direction of an image edge included in a predetermined portion within a picture, as with the edge direction detection unit 9 of the moving picture coding apparatus of the present embodiment. To be more specific, the edge direction detection unit 29 detects in which direction of the predetermined portion many edges are included. It is assumed that the predetermined portion is an initial macroblock row within a picture, and this is a common assumption with the moving picture coding apparatus. Further, the edge direction detection unit 29 also detects the direction of edges in each macroblock row other than the initial macroblock row.

The scanning scheme selection unit 20 does not need information indicating scanning scheme identifiers and prediction mode sets, and selects a scanning scheme and a prediction mode set based on its own judgment. The scanning scheme selection unit 20 is similar to the scanning scheme selection unit 10 of the moving picture coding apparatus of the present embodiment and to the scanning scheme selection unit of the first embodiment in that it selects a scanning scheme for macroblocks, a scanning scheme for blocks, and a prediction mode set. However, the following point is different. That is, the scanning scheme selection unit 20 selects a default scanning scheme and prediction mode set to code the predetermined portion, and selects a scanning scheme that is optimal for the detected edge direction to code the other portions.

Figure 17A:
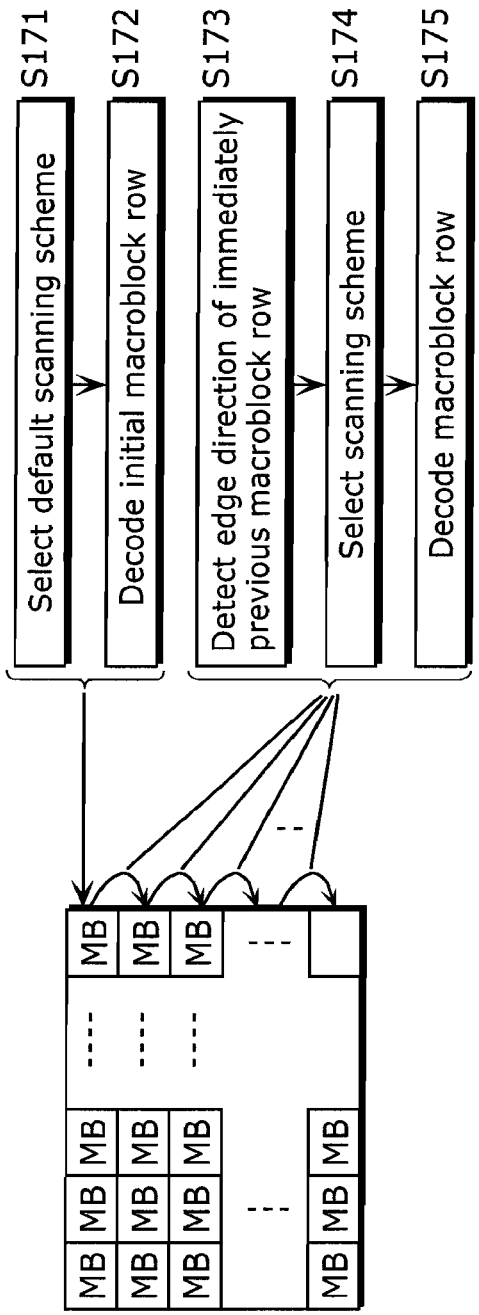
FIG. 17A is a diagram illustrating operations of the decoding apparatus.

FIG. 17A is a detailed flow chart illustrating an example of operations of the moving picture decoding apparatus 2a. FIG. 17A is different from the FIG. 15A in that "decoding" is performed instead of "coding". For the detection of edge directions and the selection of a scanning scheme and a prediction mode set, the same processing is performed. This allows the moving picture decoding apparatus 2a to select the same scanning scheme and prediction mode set as the ones selected by the moving picture coding apparatus 1a or 1b, when decoding bit streams coded by the moving picture coding apparatus 1a or 1b.

Figure 17B:
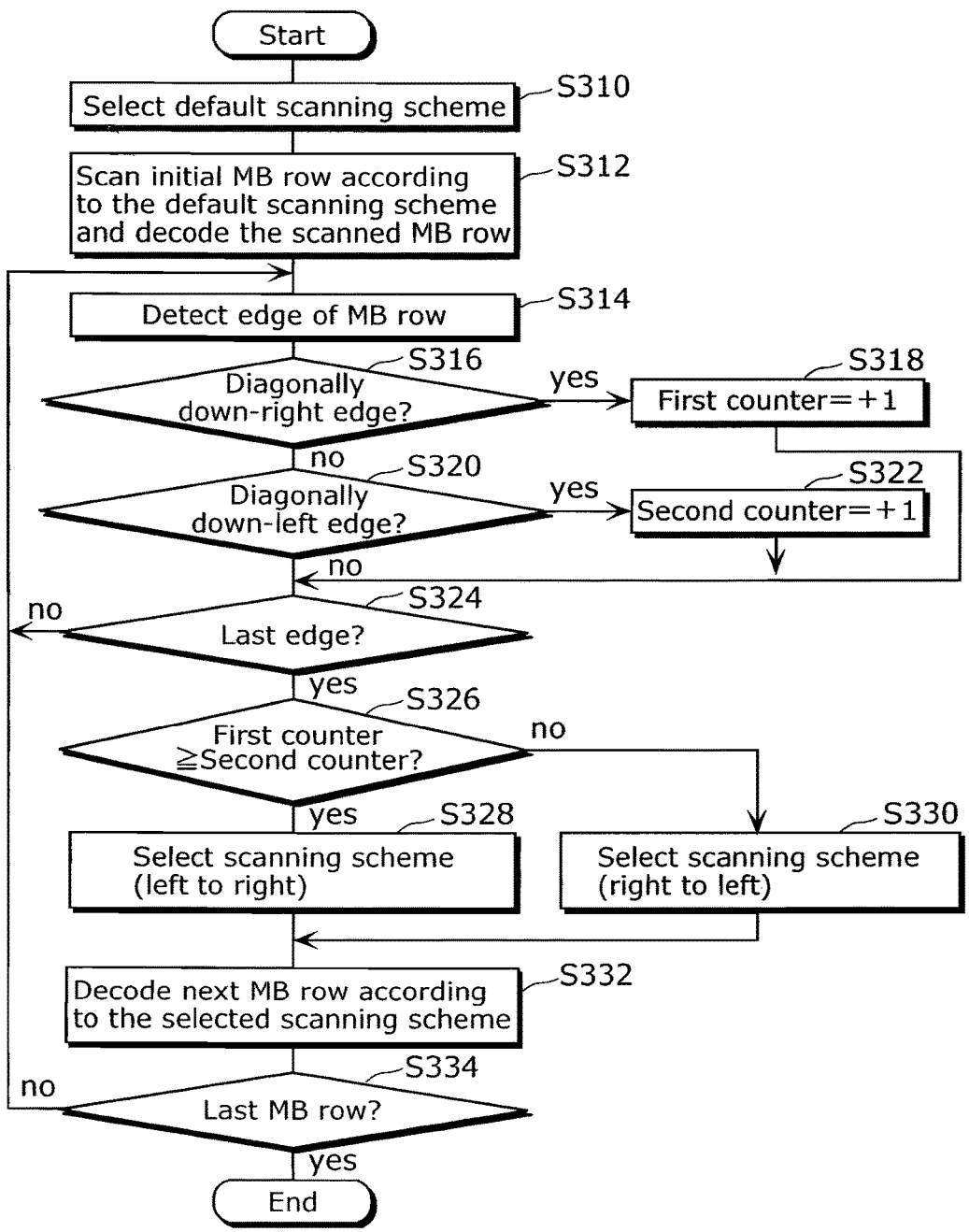
FIG. 17B is a flow chart illustrating operations of the decoding apparatus.

FIG. 17B is a flow chart illustrating operations of the decoding apparatus. FIG. 17B is different from FIG. 15B in that "decoding" is performed instead of "coding". For the detection of edge directions and the selection of a scanning scheme and a prediction mode set, the same processing is performed. Consequently, it is not necessary to include, in a bit stream, information that indicates a scanning scheme identifier of macroblocks and blocks and a prediction mode set.

As described above, according to the moving picture coding apparatus and the moving picture decoding apparatus in the present embodiment, it is unnecessary to add, to a bit stream, data indicating a scanning scheme for macroblocks, a scanning scheme for blocks, and a prediction mode set. With this, it is possible to further improve the coding efficiency.

Note that in FIG. 15A, FIG. 15B, FIG. 17A, and FIG. 17B, the scanning scheme and prediction mode set selected for coding the second macroblock row may be used for coding the third and the subsequent macroblock rows. In such a case, the edge direction detection units 9 and 29, and the scanning scheme selection units 10 and 20 need to perform the processing only on the initial macroblock row, and thus it is possible to reduce the processing load.

Further, the edge direction detection units 9 and 29, and the scanning scheme selection units 10 and 20 may perform the processing only on the odd-numbered macroblock rows or on a beginning macroblock row of every Nth row, and for coding the other macroblock rows, use the same scanning scheme and prediction mode set as the ones used for the immediately previous macroblock row.

Furthermore, the above mentioned predetermined portion within a picture is not limited to the initial macroblock row, and may be m adjacent macroblock rows commonly set between the moving picture coding apparatus and the moving picture decoding apparatus.

In addition, the scanning scheme for blocks of the initial macroblock row may be selected as in the first embodiment, instead of being default.

In the present embodiment, the description has been provided on the case example where the diagonally down-left and diagonally down-right directions of image edges are detected. Note, however, that other directions such as horizontal and vertical directions may be detected and a scanning scheme and a prediction mode set that are optimal for the detected direction may be selected.

Further, in the present embodiment, a scanning scheme is selected for every macroblock row, however, a scanning scheme may be selected for every several macroblock rows.

Figure 14B:
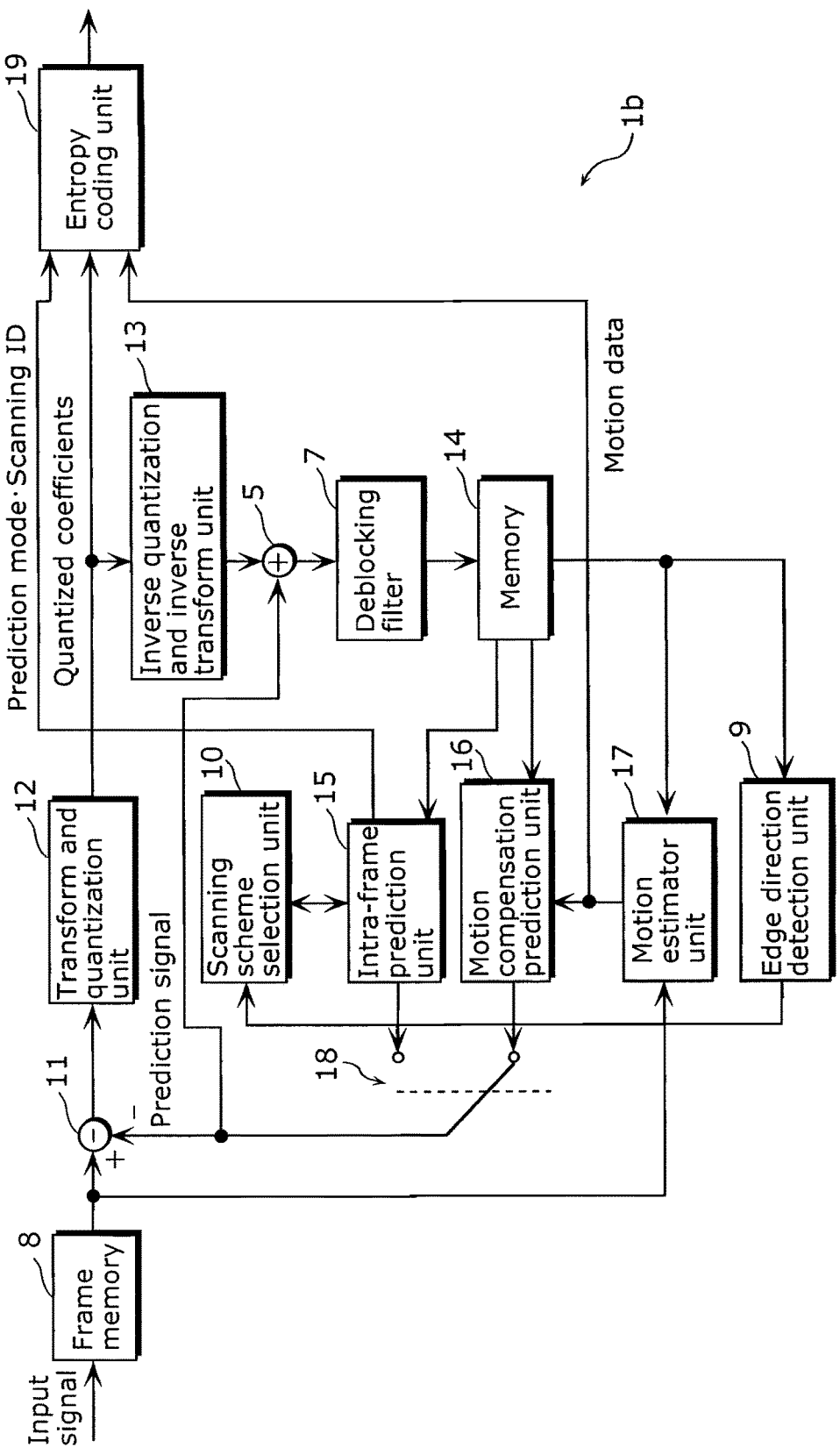
FIG. 14B is a block diagram illustrating a variation of the moving picture coding apparatus according to the second embodiment of the present invention.

In the first embodiment, the description has been provided of the case example where the scanning scheme selection unit 10 directs the intra-frame prediction unit 15 to test intra-prediction with several combinations of a scanning scheme for macroblocks, a scanning scheme for blocks, and a prediction mode set, and selects the combination which delivers the least prediction error (Step S20 in FIG. 11). Note, however, that the scanning scheme selection unit 10 may select a combination according to the content of the image using the edge direction detection unit 9. FIG. 14B illustrates a variation of the moving picture coding apparatus of the first embodiment in such a case. The moving picture coding apparatus 1b in FIG. 14B is different from the moving picture coding apparatus in FIG. 14A in that: a frame memory 8 is added; the edge direction detection unit 9 refers to the frame memory 8 instead of to the memory 14; and the scanning scheme selection unit 10 selects a scanning scheme for macroblocks, a scanning scheme for blocks, and a prediction mode set according to a detected edge direction. With this structure, the scanning scheme selection unit 10 can select a scanning scheme for macroblocks, a scanning scheme for blocks, and a prediction mode set that are suitable for the detected edge direction.

Note that each functional block of the block diagrams and each module of the flow charts in the above described embodiments is typically achieved in the form of an LSI, that is, an integrated circuit device. Each of these parts can be in plural single-function LSIs, or also can be in one integrated LSI. (For example, the functional blocks other than the memory can be in one integrated LSI.) The name used here is LSI, but it may also be called IC, system LSI, super LSI, or ultra LSI depending on the degree of integration Ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of circuit cells within LSI can be used for the same purpose.

In the future, with advancement in semiconductor technology, a brand-new technology may replace LSI. The integration can be carried out by that technology. Application of biotechnology is one such possibility.

Furthermore, among the functional blocks, the unit for storing data can be separately structured as a recording medium or a DRAM, without being in one integrated LSI.

Note that the main parts of the flow charts illustrated in the above described embodiments can also be achieved though a processor and a program.

As described, the moving picture coding method and the moving picture decoding method illustrated in the above embodiments can be used for any one of the above mentioned apparatuses and systems, and doing so allows the above described advantages to be obtained.

In addition, the present invention is not limited to the above described embodiments, and it is possible to make various changes or modifications without departing from the scope of the present invention.

The present invention is applicable to coding apparatuses which code images and decoding apparatuses which decode images, and is applicable to web servers which distribute moving pictures, network terminals which receive the moving pictures, digital cameras capable of recording and reproducing moving pictures, camera-equipped mobile phones, DVD recorders/reproducers, PDAs, Personal Computers and the like.

The invention claimed is:

1. A moving picture decoding method for decoding a coded moving picture which includes pictures, comprising:
   detecting, from the coded moving picture, a block partition into rows and columns of macroblocks each of which is partitioned into blocks, wherein each block includes pixels and has a size of 4×4 pixels or 8×8 pixels, and each macroblock has a size of 16×16 pixels;
   determining a combination of a scanning scheme for the macroblocks and a scanning scheme for the blocks of a macroblock from among a plurality of combinations of a scanning scheme for the macroblocks and a scanning scheme for the blocks of a macroblock according to a scanning scheme identifier included in the coded moving picture, wherein the scanning scheme for the macroblocks defines a scanning order of the macroblocks and the scanning scheme for the blocks of a macroblock defines a scanning order for the blocks of a macroblock;
   obtaining, from the coded moving picture, a coded block which includes pixels and a set of intra-prediction modes for the macroblocks; and
   decoding, in accordance with the set of intra-prediction modes, the blocks of a macroblock in an order in which the blocks are scanned,
   wherein the plurality of combinations includes a combination that scans a row of blocks of a macroblock being horizontally adjacent to a current macroblock and following the current macroblock with respect to the determined scanning scheme for the macroblocks before scanning a next row of blocks of the current macroblock.

2. A moving picture decoding apparatus which decodes a moving picture which includes pictures, said apparatus comprising:
   a detector operable to detect, from the coded moving picture, a block partition into rows and columns of macroblocks each of which is partitioned into blocks, wherein each block includes pixels and has a size of 4×4 pixels or 8×8 pixels, and each macroblock has a size of 16×16 pixels;

a determiner operable to determine a combination of a scanning scheme for the macroblocks and a scanning scheme for the blocks of a macroblock from among a plurality of combinations of a scanning scheme for the macroblocks and a scanning scheme for the blocks of a macroblock according to a scanning scheme identifier included in the coded moving picture, wherein the scanning scheme for the macroblocks defines a scanning order of the macroblocks and the scanning scheme for the blocks of a macroblock defines a scanning order for the blocks of a macroblock;

an obtainer operable to obtain, from the coded moving picture, a coded block which includes pixels and a set of intra-prediction modes for the macroblocks; and a decoder operable to decode, in accordance with the set of intra-prediction modes, the blocks of a macroblock in an order in which the blocks are scanned, wherein the plurality of combinations includes a combination that scans a row of blocks of a macroblock being horizontally adjacent to a current macroblock and following the current macroblock with respect to the determined scanning scheme for the macroblocks before scanning a next row of blocks of the current macroblock.

* * * * *